United States Patent
Furuta et al.

(10) Patent No.: US 10,525,668 B2
(45) Date of Patent: *Jan. 7, 2020

(54) PRESSURE-SENSITIVE ADHESIVE SHEET

(71) Applicant: NITTO DENKO CORPORATION, Ibaraki-shi, Osaka (JP)

(72) Inventors: Kenji Furuta, Ibaraki (JP); Yoshio Terada, Ibaraki (JP); Tadashi Takahashi, Ibaraki (JP); Mitsuhiro Kanada, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 82 days.

This patent is subject to a terminal disclaimer.

(21) Appl. No.: 15/445,061

(22) Filed: Feb. 28, 2017

(65) Prior Publication Data

US 2017/0253773 A1  Sep. 7, 2017

(30) Foreign Application Priority Data

Mar. 2, 2016 (JP) .................. 2016-039903
Jan. 23, 2017 (JP) .................. 2017-009329

(51) Int. Cl.
| | | |
|---|---|---|
| *B32B 7/12* | (2006.01) | |
| *B32B 27/36* | (2006.01) | |
| *B32B 37/12* | (2006.01) | |
| *C09J 133/06* | (2006.01) | |
| *C09J 7/38* | (2018.01) | |
| *C09J 7/22* | (2018.01) | |
| *C09J 7/29* | (2018.01) | |
| *C09J 7/28* | (2018.01) | |
| *B32B 15/082* | (2006.01) | |

(Continued)

(52) U.S. Cl.
CPC ............... *B32B 7/12* (2013.01); *B32B 27/36* (2013.01); *B32B 37/12* (2013.01); *C09J 133/066* (2013.01); *C09J 2201/122* (2013.01); *C09J 2201/606* (2013.01); *C09J 2400/163* (2013.01); *C09J 2433/00* (2013.01)

(58) Field of Classification Search
CPC .................. B32B 7/12; C09J 7/29; C09J 7/28
See application file for complete search history.

(56) References Cited

U.S. PATENT DOCUMENTS 8,248,724 B2  8/2012  Hayakawa et al.
9,025,279 B2  5/2015  Furuta et al.

(Continued)

FOREIGN PATENT DOCUMENTS

JP  2010-3356 A  1/2010
JP  2014-162874 A  9/2014

*Primary Examiner* — Victor S Chang
(74) *Attorney, Agent, or Firm* — Hauptman Ham, LLP

(57) ABSTRACT

A pressure-sensitive adhesive sheet includes a pressure-sensitive adhesive layer and a substrate layer configured to support the pressure-sensitive adhesive agent layer. The pressure-sensitive adhesive layer has a storage modulus of 250 kPa or less at 23° C. The substrate layer has an elastic modulus of 1680 N/cm to 3000 N/cm both inclusive. The pressure-sensitive adhesive sheet shows a deviation amount less than 1.0 mm. The amount is the deviation amount of the pressure-sensitive adhesive sheet per 250 gf/cm$^2$ of the sheet in a holding ability test at 80° C. after one hour from a time when the test is started.

26 Claims, 4 Drawing Sheets

(51) Int. Cl.
*B32B 15/085* (2006.01)
*B32B 15/088* (2006.01)
*B32B 15/09* (2006.01)
*B32B 15/12* (2006.01)
*B32B 15/18* (2006.01)
*B32B 15/20* (2006.01)
*B32B 27/08* (2006.01)
*B32B 27/10* (2006.01)
*B32B 27/28* (2006.01)
*B32B 27/30* (2006.01)
*B32B 27/32* (2006.01)

(56) References Cited

U.S. PATENT DOCUMENTS

2011/0038076 A1    2/2011   Hayakawa et al.
2014/0240869 A1    8/2014   Furuta et al.
2017/0253773 A1*   9/2017   Furuta .................. B32B 15/082

* cited by examiner

PRESSURE-SENSITIVE ADHESIVE SHEET

CROSS REFERENCE TO RELATED APPLICATION

This application claims priority from Japanese Patent Application No. 2016-039903 filed on Mar. 2, 2016 and Japanese Patent Application No. 2017-009329 filed on Jan. 23, 2017. The entire contents of the priority application are incorporated herein by reference.

BACKGROUND

Field of the Invention

The present invention relates to a pressure-sensitive adhesive sheet.

Background

A pressure-sensitive adhesive sheet excellent in airtight performance has been known. An example of the pressure-sensitive adhesive sheet is a pressure-sensitive adhesive sheet used in a magnetic disc device (see, for example, JP 2014-162874A). A pressure-sensitive adhesive sheet of this kind is used, for example, for covering a narrow gap made between a box-form base part which a magnetic disc device has, and a plate-form cover part attached to this base part. By covering the gap with the pressure-sensitive adhesive sheet in this way, the airtight performance of the inside of the magnetic disc device is kept.

A pressure-sensitive adhesive sheet of this type is also used to cover a filling-opening through which a low-density gas (such as helium) is filled into a magnetic disc device. As disclosed in JP 2010-3356A, the magnetic disc device may be a device into which a low-density gas is filled in order to restrain, for example, the disturbance of air flow that is generated when the device is driven. In such a magnetic disc device, filling-opening thereof is covered with a pressure-sensitive adhesive sheet in order for the low-density gas not to leak to the outside, after the magnetic disc device being filled with the low-density gas.

Patent Document 1: Japanese Unexamined Patent Application Publication No. 2014-162874

Patent Document 2: Japanese Unexamined Patent Application Publication No. 2010-3356

SUMMARY

A pressure-sensitive adhesive sheet, including a pressure-sensitive adhesive layer, and a substrate layer configured to support the pressure-sensitive adhesive layer, the pressure-sensitive adhesive layer having a storage modulus of 250 kPa or less at 23° C., the substrate layer having an elastic modulus of 1680 N/cm to 3000 N/cm both inclusive, and the pressure-sensitive adhesive sheet showing a deviation amount less than 1.0 mm, the amount being the deviation amount of the pressure-sensitive adhesive sheet per 250 gf/cm$^2$ of the sheet in a holding ability test at 80° C. after one hour from a time when the test is started.

DETAILED DESCRIPTION

Figure 1:
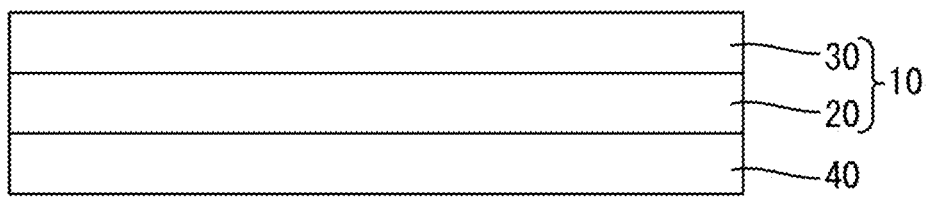
FIG. 1 is a sectional view illustrating a structure of a single-sided pressure-sensitive adhesive sheet according to an embodiment.

Pressure-sensitive adhesive sheets of this type are required to be further improved in airtight performance. For example, even when the surface of an adherend to which a pressure-sensitive adhesive sheet is attached appears to be a flat and smooth surface with the naked eye, the surface is actually an uneven surface in which numerical irregularities each having a size of several micrometers are made. Thus, when the pressure-sensitive adhesive sheet is bonded to the surface, a large number of very small spaces are made to be dotted between the uneven surface of the adherend and a pressure-sensitive adhesive layer (pressure-sensitive adhesive surface) of the pressure-sensitive adhesive sheet. The spaces become a problem since in the use of the pressure-sensitive adhesive sheet under high-temperature conditions (for example, when heat is generated from a magnetic disc device with the sheet), the pressure-sensitive adhesive layer is, for example, deformed so that the spaces may become channels through which gas is passed.

The present invention was made to solve the above described problems and to achieve the following objects. An object of the present invention is to provide a pressure-sensitive adhesive sheet which is not easily peeled from an adherend even under high-temperature conditions to be excellent in airtight performance.

In order to attain the object, the inventors have made eager investigations to find out that the following pressure-sensitive adhesive sheet is not easily peeled under high-temperature conditions to be excellent in airtight performance: a pressure-sensitive adhesive sheet, including a pressure-sensitive adhesive layer, and a substrate layer configured to support the pressure-sensitive adhesive layer, the pressure-sensitive adhesive layer having a storage modulus of 250 kPa or less at 23° C., the substrate layer having an elastic modulus of 1680 N/cm to 3000 N/cm both inclusive, and the pressure-sensitive adhesive sheet showing a deviation amount less than 1.0 mm, the amount being the deviation amount of the pressure-sensitive adhesive sheet per 250 gf/cm$^2$ of the sheet in a holding ability test at 80° C. after one hour from a time when the test is started.

Pressure-Sensitive Adhesive Sheet

The pressure-sensitive adhesive sheet of an embodiment of the present invention has at least one pressure-sensitive adhesive layer and a substrate layer that supports the pressure-sensitive adhesive layer.

In general, a "pressure-sensitive adhesive sheet" may be called, for example, a "pressure-sensitive adhesive tape" or a "pressure-sensitive adhesive film", which is a name different from the name of the pressure-sensitive adhesive sheet. In the present specification, however, these different expressions are unified to the expression "pressure-sensitive adhesive sheet". An outer surface of the pressure-sensitive adhesive layer in the pressure-sensitive adhesive sheet may be referred to as a "pressure-sensitive adhesive surface".

The pressure-sensitive adhesive sheet of the embodiment may be of a single-sided pressure-sensitive adhesive type, in which only a single surface of the sheet is a pressure-sensitive adhesive surface, or of a double-sided pressure-sensitive adhesive type, in which both surfaces of the sheet are each a pressure-sensitive adhesive surface.

FIG. 1 is a sectional view illustrating a structure of a single-sided pressure-sensitive adhesive sheet 10 according to an embodiment. This pressure-sensitive adhesive sheet 10 has a substrate layer 30, and a single pressure-sensitive adhesive layer 20 laminated on one surface of the substrate layer 30. A peeling liner 40 is bonded to an outside-directed surface (pressure-sensitive adhesive surface) of the pressure-sensitive adhesive layer.

Figure 2:
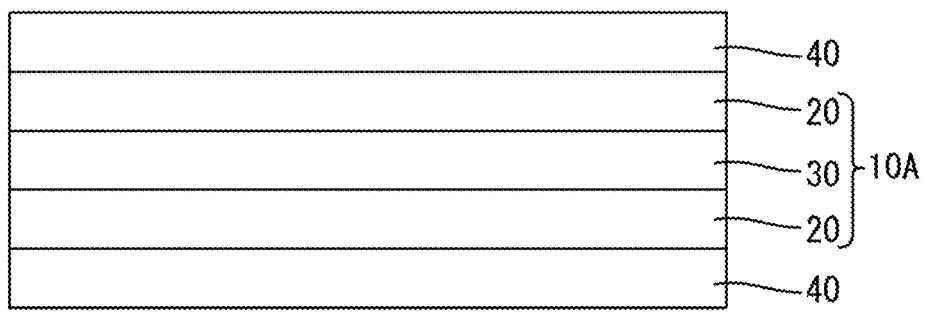
FIG. 2 is a sectional view illustrating a structure of a double-sided pressure-sensitive adhesive sheet according to another embodiment.

FIG. 2 is a sectional view illustrating a structure of a double-sided pressure-sensitive adhesive type pressure-sensitive adhesive sheet 10A according to another embodiment. This pressure-sensitive adhesive sheet 10A has a substrate layer 30, and two pressure-sensitive adhesive layers 20 and 20 each laminated on front and rear side surfaces (both surfaces) of the substrate layer 30. Peeling liners 40 are bonded, respectively, to two outside-directed surfaces (pressure-sensitive adhesive surfaces) of the pressure-sensitive adhesive layers.

The pressure-sensitive adhesive sheets may each have any layer (such as an intermediate layer or an undercoat layer) other than the substrate layer and the pressure-sensitive adhesive layer as far as the attainment of the object of the present invention is not hindered.

The following will describe the substrate layer and the pressure-sensitive adhesive layer, which constitutes the pressure-sensitive adhesive sheets.

Substrate Layer

The substrate layer is a member which holds the pressure-sensitive adhesive layer, and can follow the shape of a surface of an adherend to be bent or deformed into some other form. The elastic modulus thereof ranges from 1680 N/cm to 3000 N/cm both inclusive. The elastic modulus of the substrate layer is measured by a measuring method that will be described later. When the elastic modulus of the substrate is in this range, the substrate layer is restrained from impeding the softness of the pressure-sensitive adhesive layer while the substrate layer has an appropriate strength and softness. Thus, the substrate layer easily keeps the airtight performance of the pressure-sensitive adhesive sheet.

The structure of the substrate is not particularly limited, and may be, for example, a metallic substrate layer made of only a metallic layer, or a composite substrate layer in which a metallic layer and a plastic film layer are laminated onto each other, using a known laminating method such as a dry laminating method.

The metallic substrate layer is made of only a layer of a metal such as aluminum, copper, silver, iron, nickel, tin, or stainless steel. As the metallic substrate layer, a metallic foil piece such as an aluminum foil piece is used. When the substrate layer is the metallic substrate layer, this layer is preferably a layer made of only aluminum foil piece for, e.g., the following reasons: the elastic modulus of the substrate layer is easily set; and the substrate layer is good in adhesiveness to the pressure-sensitive adhesive layer.

The composite substrate layer may have a structure having a metallic layer and a plastic layer laminated on a single surface of this metallic layer, or a structure having a pair of plastic film layer laminated onto a metallic layer to sandwich the metallic layer between the paired plastic film layers. Between the metallic layer and the plastic layer, a laminated layer (bonding layer) may be interposed.

The metallic layer of the composite substrate layer may be, for example, the same metallic layer (for example, an aluminum foil piece) as given as any one of the examples of the metallic substrate layer; or may be a film-form product made of a metal and formed by an ordinary film-forming method such as a vapor deposition method or a sputtering method. The metallic layer of the composite substrate layer is preferably an aluminum layer for, e.g., the reason that the elastic modulus of the substrate layer is easily set to the above-mentioned range and the adhesiveness of the aluminum layer to the pressure-sensitive adhesive layer is good.

When the substrate layer is made of the above-defined composite substrate layer, the thickness of the metallic layer is, for example, 2 μm or more, preferably 4 μm or more, even more preferably 6 μm or more, and is 15 μm or less, preferably 13 μm or less, even more preferably 11 μm or less. The thickness of the metallic layer in such a range restrains any one of the above-mentioned pressure-sensitive adhesive sheets from being wrinkled when the pressure-sensitive adhesive sheet is bonded to an adherend.

The plastic film layer of the composite substrate layer is made of a plastic material, for example, a polyester resin such as polyethylene terephthalate (PET) or polybutylene terephthalate (PBT), an polyolefin resin such as polyethylene (PE) or polypropylene (PP), a polyvinyl chloride resin, an acrylic resin, a vinyl acetate based resin, an amide resin, a polyimide resin (PI), a polyetheretherketone or polyphenylene sulfide. The plastic material used in the plastic film layer is preferably a polyester resin or polyolefin resin, more preferably a polyester resin, even more preferably polyethylene terephthalate (PET). The plastic film layer may be in a mono-layered form or in a multi-layered layer.

The substrate layer may be a layer made of only a plastic film layer as far as the attainment of the object of the present invention is not hindered.

When the substrate layer is made of the above-defined composite substrate layer, the total thickness of the plastic film layer is, for example, 25 μm or more, preferably 30 μm or more, and is 70 μm or less, preferably 65 μm or less. The total thickness of the plastic film layer in such a range makes it easy that the plastic film layer easily keep a rigidity and an elastic modulus each required for the substrate layer (composite substrate layer). When the composite substrate layer has the paired plastic layers, the plastic film layers may be equal to or different from each other in thickness. When the paired plastic film layers are different from each other in thickness, it is preferred that one of the plastic film layers on the pressure-sensitive adhesive layer formed side (inner side) of the sheet is made larger in thickness than the other plastic film layer, which is positioned on the outside of the sheet.

The total thickness of the plastic film layer is 50% or more, preferably 70% or more, more preferably 80% or more of the thickness of the substrate layer, and is less than 100%, preferably 99% or less, more preferably 95% or less thereof from the viewpoint of the rigidity of the pressure-sensitive adhesive sheet, and others.

The thickness (total thickness) of the substrate layer is, for example, 10 μm or more, preferably 15 μm or more, more preferably 20 μm or more, and is 100 μm or less, preferably 90 μm or less, more preferably 80 μm or less. When the thickness of the substrate layer is in such a range, the elastic modulus of the substrate layer is easily controlled into the above-mentioned specified range.

Both surfaces or a single surface of the substrate layer may be optionally subjected to a known or conventional surface treatment (for example, a chemical-or physical-method-used oxidization treatment, such as chromic acid treatment, ozone exposure, flame exposure, high-pressure electric shock exposure, or ionization radial ray treatment)

.or coating treatment by an undercoating agent. It is allowable to apply the surface treatment, particularly, to the pressure-sensitive adhesive layer formed side surface of the substrate layer, thereby improving the adhesiveness between the substrate layer and the pressure-sensitive adhesive layer, and other performances.

The elastic modulus of the substrate layer is preferably 1700 N/cm or more, and is preferably 2800 N/cm or less, more preferably 2700 N/cm or less. When the elastic modulus of the substrate layer is in such a range, the pressure-sensitive adhesive sheet is restrained from being wrinkled when bonded to an adherend, and further ensures the performance of following its irregularities, and bendability.

Pressure-Sensitive Adhesive layer

The pressure-sensitive adhesive layer is a layer which supplies a pressure-sensitive adhesive surface that can be bonded to an adherend, and has a storage modulus of 250 kPa or less at 23° C. The storage modulus (at 23° C.) of the pressure-sensitive adhesive layer is measured by a method that will be described later.

The pressure-sensitive adhesive layer shows a deviation amount less than 1.0 mm This amount is a deviation amount of the pressure-sensitive adhesive sheet per 250 gf/cm² of the sheet in a holding ability test at 80° C. after one hour from a time when the test is started. The deviation amount (holding ability) of the pressure-sensitive adhesive layer is measured by a method that will be described later.

The pressure-sensitive adhesive layer is made mainly of a pressure-sensitive adhesive agent. The pressure-sensitive adhesive agent forming the pressure-sensitive adhesive layer is not particularly limited as far as the attainment of the object of the present invention is not hindered. Examples of the agent include acrylic pressure-sensitive adhesive agents, rubber pressure-sensitive adhesive agents, vinyl alkyl ether pressure-sensitive adhesive agents, silicone pressure-sensitive adhesive agents, polyester pressure-sensitive adhesive agents, polyamide pressure-sensitive adhesive agents, urethane based pressure-sensitive adhesive agents, fluorine-contained pressure-sensitive adhesive agents, and epoxy pressure-sensitive adhesive agents. These may be used singly, or in any combination of two or more thereof.

The pressure-sensitive adhesive agent is preferably an acrylic pressure-sensitive adhesive agent, or rubber pressure-sensitive adhesive agent for, e.g., the reason that the object of the present invention is easily attained. The acrylic pressure-sensitive adhesive agent is a pressure-sensitive adhesive agent containing an acrylic polymer as a base polymer (basic component of the pressure-sensitive adhesive agent). The rubber pressure-sensitive adhesive agent is a pressure-sensitive adhesive agent containing a rubber polymer as a base polymer. The rubber polymer usable in the rubber pressure-sensitive adhesive agent is preferably a synthetic rubber (in particular, a styrene-isoprene-styrene copolymer (SIS)) that will be detailed later.

The pressure-sensitive adhesive layer is made of a predetermined pressure-sensitive adhesive composition. The pressure-sensitive adhesive composition may be in any form as far as the attainment of the object of the present invention is not hindered. The form is, for example, an active energy ray curing type, thermosetting type, solution type (solvent type), emulsion type, hot melt type, or solvent-free type form.

A solvent used in the pressure-sensitive adhesive composition may be an ordinary solvent that may be of various types. Examples of the solvent include esters such as ethyl acetate, and n-butyl acetate; aromatic hydrocarbons such as toluene, and benzene; aliphatic hydrocarbons such as n-hexane, and n-heptane; alicyclic hydrocarbons such as cyclohexane, and methylcyclohexane; ketones such as methyl ethyl ketone, and methyl isobutyl ketone; and other organic solvents. These solvents may be used singly or in any combination of two or more thereof.

The base polymer (basic component) of the pressure-sensitive adhesive agent forming the pressure-sensitive adhesive composition is not particularly limited. Examples thereof include acrylic polymers, rubber polymers, vinyl alkyl ether polymers, silicone polymers, polyester polymers, polyamide polymers, urethane polymers, fluorine-contained polymers, and epoxy polymers. These base polymers may be used singly, or in any combination of two or more thereof.

The base polymer is preferably an acrylic polymer or a rubber polymer from the viewpoint of easiness of the design of the polymer, balance between properties of the polymer, and others. An acrylic polymer is particularly preferred from the viewpoint of a smallness in the deviation amount (holding ability) of the pressure-sensitive adhesive layer, and others.

The acrylic polymer as the base polymer is preferably a polymer mainly having the following units as monomer units (monomer component units) included in the acrylic polymer: units each having an alkyl (meth)acrylate having an alkyl group (linear or branched alkyl group) having 1 to 18 carbon atoms (hereinafter, the (meth)acrylate will be referred to merely as the alkyl (meth)acrylate). In the present specification, the wording "(meth)acrylate" denotes "acrylate" and/or "methacrylate" (either or both of "acrylate" and "methacrylate").

The alkyl (meth)acrylate is, for example, preferably a compound represented by the formula (1):

$$CH_2=C(R_1)COOR_2 \qquad (1)$$

wherein $R_1$ is a hydrogen atom or a methyl group, and $R_2$ is a linear alkyl group having 1 to 18 carbon atoms. Hereinafter, the range of the number of the carbon atoms may be expressed as "$C_{1-18}$". From the viewpoint of the storage modulus of the pressure-sensitive adhesive agent, and others, it is suitable to render an alkyl (meth)acrylate in which $R_2$ is a linear alkyl group of $C_{1-14}$ (for example, $C_{2-10}$, typically, $C_{4-9}$) a main monomer for the acrylic polymers. From the viewpoint of pressure-sensitive adhesive properties of the pressure-sensitive adhesive sheet, it is preferred to render an alkyl acrylate in which $R_1$ is a hydrogen atom and $R_2$ is a linear alkyl group of $C_{4-9}$ (hereinafter also referred to only as the $C_{4-9}$ alkyl acrylate) the main monomer.

Specific examples of the alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate (lauryl (meth)acrylate), tridecyl (meth)acrylate, tetradecyl (meth)acrylate, pentadecyl (meth)acrylate, hexadecyl (meth)acrylate, heptadecyl (meth)acrylate, octadecyl (meth)acrylate (stearyl (meth)acrylate), and isostearyl (meth)acrylate. These (meth)acrylates may be used singly or in any combination of two or more thereof. The (meth)acrylate is preferably n-butyl acrylate (BA), 2-ethylhexyl acrylate (2EHA), isooctyl acrylate (iOA), or isononyl acrylate (iNA).

The content (% by mass) of the monomer units of the alkyl (meth)acrylate is, for example, 70% by mass or more, preferably 75% by mass or more, more preferably 80% by mass or more, and is 97% by mass or less, preferably 95% by mass or less, more preferably 93% by mass or less.

As far as the advantageous effects of the present invention are not remarkably damaged, a monomer (different monomer) other than the above monomers may be copolymerized with the acrylic polymer in the technique disclosed herein. The different monomer is usable, for example, to adjust the glass transition temperature (Tg) of the acrylic polymer and adjust pressure-sensitive adhesive performances (for example, peel performance) of the pressure-sensitive adhesive sheet. The different monomer is, for example, a monomer that can improve cohesive force or heating resistance of the pressure-sensitive adhesive agent, and this monomer is, for example, any sulfonate-group-containing monomer, phosphate-group-containing monomer, cyano-group-containing monomer, vinyl ester, alicyclic (meth)acrylate, aromatic vinyl compound, or polyfunctional monomer having two or more polymerizable functional groups such as unsaturated doubled bonds.

Examples of the sulfonate-group-containing monomer include 2-acrylamide-2-methylpropanesulfonic acid, and sulfopropyl acrylate. An example of the phosphate-group-containing monomer includes 2-hydroxyethylacryloyl phosphate. Examples of the cyano-group-containing monomer include acrylonitrile, and methacrylonitrile. Examples of the vinyl ester include vinyl acetate, vinyl propionate, and vinyl laurate. An example of the alicyclic (meth)acrylate includes isobornyl (meth)acrylate. Examples of the aromatic vinyl compound include styrene, chlorostyrene, chloromethylstyrene, α-methylstyrene, and other substituted styrenes.

Examples of the polyfunctional monomer having two or more polymerizable functional groups such as unsaturated doubled bonds (hereinafter referred to merely as the "polyfunctional monomer") include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, and urethane acrylate.

About the acrylic polymer contained in the pressure-sensitive adhesive layer, the content of the monomer units each originating from the polyfunctional monomer is preferably more than 0% by mass, more preferably 0.001% by mass or more, even more preferably 0.01% by mass or more, and is preferably 0.1% by mass or less of the polymer.

The different monomer may be a monomer making it possible to introduce functional groups which are to be crosslinking base points to the acrylic polymer, or contribute to an improvement of the pressure-sensitive adhesive sheet in pressure-sensitive adhesive force. The different monomer is, for example, any carboxyl-group-containing monomer, hydroxyl-group (OH-group) containing monomer, anhydride-group-containing monomer, amide-group-containing monomer, amino-group-containing monomer, imide-group-containing monomer, epoxy-group-containing monomer, (meth)acryloylmorpholine, or vinyl ether.

The above-mentioned "different monomer" may be used singly, or in any combination of two or more thereof. The total content of the different monomer is preferably 0.001% by mass or more, more preferably 0.01% by mass or more, even more preferably 0.1% by mass or more, and is preferably 40% by mass or less, more preferably 35% by mass or less, even more preferably 30% by mass or less of all the monomer components.

Examples of the carboxyl-group-containing monomer include (meth)acrylic acid, itaconic acid, maleic acid, fumaric acid, crotonic acid, and isocrotonic acid; and respective acid anhydrides of these acids (such as maleic anhydride, itaconic anhydride, and other acid-anhydride-containing monomers). Out of these examples, (meth)acrylic acid is preferred, and acrylic acid is particularly preferred. These carboxyl-group-containing monomers may be used singly, or in any combination of two or more of.

About the acrylic polymer contained in the pressure-sensitive adhesive layer, the content of the monomer units each originating from the carboxyl-group-containing monomer is preferably 2% by mass or more, more preferably 3% by mass or more, and is preferably 8% by mass or less, more preferably 7.5% by mass or less of the polymer.

Examples of the hydroxyl-group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl) methylacrylate.

Examples of the amide-group-containing monomer include (meth)acrylamide, N,N-dimethyl(meth)acrylamide, N,N-diethyl(meth) acrylamide, N-butyl(meth)acrylamide, N-methylol(meth)acrylamide, N-methylolpropane(meth)acrylamide, N-methoxymethyl(meth)acrylamide, N-butoxymethyl(meth)acrylamide, and hydroxyethyl(meth)acrylamide.

Examples of the amino-group-containing monomer include N,N-dialkylaminoalkyl (meth)acrylates such as N,N-dimethylaminomethyl (meth)acrylate, N,N-dimethylaminoethyl (meth)acrylate, and N,N-diethylaminoethyl (meth)acrylate; N-alkylaminoalkyl (meth)acrylates such as N-methylaminoethyl (meth)acrylate, and N-ethylaminoethyl (meth)acrylate; N,N-dialkylamino (meth)acrylates such as N,N-dimethylamino(meth)acrylate; N-alkylamino (meth)acrylates such as N-methylamino(meth)acrylate; aminoalkyl (meth)acrylates such as aminomethyl (meth)acrylate; and amino(meth)acrylate.

Examples of the imide-group-containing monomer include maleimide monomers such as N-cyclohexylmaleimide, and N-phenylmaleimide; itaconimide monomers such as N-methylitaconimide; and succinimide monomers such as N-(meth)acryloxymethylene succinimide Examples of the epoxy-group-containing monomer include glycidyl (meth)acrylate, methylglycidyl (meth)acrylate, and ally glycidyl ether.

Examples of the rubber polymer used in the pressure-sensitive adhesive composition include styrene-isoprene-styrene block copolymer (SIS), styrene-butadiene-styrene block copolymer (SBS), respective hydrogenated products of these styrene based block copolymers, styrene-butadiene rubber (SBR), polyisoprene rubber (IR), polyisobutylene (PIB), butyl rubber (IIR), and other synthetic rubbers. These synthetic rubbers may be used singly or in any combination of two or more thereof. Out of these examples, SIS is particularly preferred as the rubber polymer used in the pressure-sensitive adhesive composition from the viewpoint of the pressure-sensitive adhesive force, holding ability and airtight performance thereof, and others.

When the pressure-sensitive adhesive composition contains a polymerization initiator, the polymerization initiator is, for example, a photopolymerization initiator or a thermopolymerization initiator. Such polymerization initiators may be used singly or in any combination of two or more thereof.

The photopolymerization initiator is not particularly limited, and examples thereof include benzoin ether type, acetophenone type, α-ketol type, aromatic sulfonyl chloride type, optically active oxime type, benzoin type, benzil type, benzophenone type, ketal type, and thioxanthone type photopolymerization initiators.

Specifically, examples of the benzoin ether type photopolymerization initiator include benzoin methyl ether, benzoin ethyl ether, benzoin propyl ether, benzoin isopropyl ether, benzoin isobutyl ether, 2,2-dimethoxy-1,2-diphenylethane-1-one, and anisole methyl ether.

Examples of the acetophenone type photopolymerization initiator include 2,2-diethoxyacetophenone, 2,2-dimethoxy-2-phenylacetophenone, 1-hydroxycyclohexyl phenyl ketone, 4-phenoxydichloroaetophenone, and 4-t-butyldichloroacetophenone.

Examples of the a-ketol type photopolymerization initiator include 2-methyl-2-hydroxypropiophenone, and 1-[4-(2-hydroxyethyl)-phenyl]-2-hydroxy-2-methylpropane-1-one. An example of the aromatic sulfonyl chloride type photopolymerization initiator is 2-naphthalenesulfonyl chloride.

An example of the optically active oxime type photopolymerization initiator is 1-phenyl-1,1-propanedione-2-(o-ethoxycarbonyl)-oxime. An example of the benzoin type photopolymerization initiator is benzoin. An example of the benzil type photopolymerization initiator is benzil.

Examples of the benzophenone type photopolymerization initiator include benzophenone, benzoyl benzoate, 3,3-dimethyl-4-methoxybenzophenone, polyvinylbenzophenone, and α-hydroxycyclohexyl phenyl ketone. An example of the ketal type photopolymerization initiator is benzyl dimethyl ketal.

Examples of the thioxanthone type photopolymerization initiator include thioxanthone, 2-chlorothioxanthone, 2-methylthioxanothone, 2,4-dimethylthioxanothone, isopropylthioxanthone, 2,4-dichlorothioxanthone, 2,4-diethylthioxathone, 2,4-diisopropylthioxanthone, and dodecylthioxanthone.

The content of the photopolymerization initiator in the pressure-sensitive adhesive composition is not particularly limited, and is, for example, 0.001 parts by mass or more, preferably 0.05 parts by mass or more, and is 5 parts by mass or less, preferably 3 parts by mass or less based on 100 parts by mass of all the above-mentioned monomer components (or the base polymer).

When the photopolymerization initiator is activated, an active energy ray is radiated thereto. Examples of the active energy ray include ionizing radiations such as an α ray, a β ray, a γ ray, a neutron beam, and an electron beam; and ultraviolet rays. Ultraviolet rays are particularly preferred. The radiation energy, the radiation period and other factors of the active energy ray are not particularly limited. It is sufficient for these factors to make it possible to activate the photopolymerization initiator to generate reaction between the monomer components.

The thermopolymerization initiator is not particularly limited, and examples thereof include azo thermopolymerization initiators such as 2,2'-azobisisobutyronitrile, 2,2'-azobis-2-methylbutyronitrile, dimethyl 2,2'-azobis(2-methylpropionate), 4,4'-azobis-4-cyanovalerianic acid, azobisisovaleronitrile, 2,2'-azobis (2-amidinopropane) dihydrochloride, 2,2'-azobis [2(5 -methyl-2-imidazoline-2-yl) prop ane] dihydrochloride, 2,2'-azobis(2-methylpropionamidine) disulfate, and 2,2'-azobis(N,N'-dimethyleneisobutylamidine) dihydrochloride; peroxide thermopolymerization initiators such as dibenzoyl peroxide, tert-butyl permaleate, t-butyl hydroperoxide, di-t-butyl peroxide, t-butyl peroxybenzoate, dicumyl peroxide, 1,1-bis (t-butylperoxy)-3,3,5-trimethylcyclohexane, and 1,1-bis (t-butylperoxy)cyclododecane; and redox thermopolymerization initiators.

The content of the thermopolymerization initiator in the pressure-sensitive adhesive composition is not particularly limited, and is, for example, 0.001 parts by mass or more, preferably 0.05 parts by mass or more, and is 5 parts by mass or less, preferably 3 parts by mass or less based on 100 parts by mass of all the above-mentioned monomer components (or the base polymer).

Furthermore, a crosslinking agent may blended into the pressure-sensitive adhesive composition, for example, to heighten cohesive force of the pressure-sensitive adhesive layer, thereby making the pressure-sensitive adhesive layer better in pressure-sensitive adhesive performance and others.

Examples of the crosslinking agent include isocyanate type, epoxy type, melamine type, peroxide type, urea type, metal alkoxide type, metal chelate type, metal salt type, carbodiimide type, oxazoline type, aziridine type, and amine type crosslinking agents. Out of these examples, an isocyanate type crosslinking agent is more preferred. These crosslinking agents may be used singly or in any combination of two or more thereof.

Examples of the isocyanate type crosslinking agent include lower aliphatic polyisocyanates such as 1,2-ethylene diisocyanate, 1,4-butylene diisocyanate, and 1,6-hexamethylene diisocyanate; alicyclic polyisocyanates such as cyclopentylene diisocyanate, cyclohexylene diisocyanate, isophorone diisocyanate, hydrogenated tolylene diisocyanate, hydrogenated xylene diisocyanate, hydrogenated xylylene diisocyanate; and aromatic polyisocyanates such as 2,4-tolylene diisocyanate, 2,6-tolylene diisocyanate, 4,4'-diphenylmethane diisocyanate, and xylylene diisocyanate. The isocyanate type crosslinking agent may be, for example, a trimethylolpropane/tolylene diisocyanate adduct [trade name: "CORONATE L" manufactured by Nippon Polyurethane Industry Co., Ltd.], or a trimethylolpropane/hexamethylene diisocyanate adduct [trade name: "CORONATE HL" manufactured by Nippon Polyurethane Industry Co., Ltd.].

Examples of the epoxy crosslinking agent include N,N,N',N'-tetraglycidyl-m-xylenediamine, diglycidylaniline, 1,3-bis(N,N-glycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, diglycidyl adipate, diglycidyl o-phthalate, triglycidyl-tris(2-hydroxyethyl) isocyanurate, resorcin diglycidyl ether, and bisphenol-S-diglycidyl ether, and other epoxy resins each having, in the molecule thereof, two or more epoxy groups.

The blend amount of the crosslinking agent is preferably an amount larger than 1.0 part by mass based on 100 parts by mass of all the monomer components (or the base polymer). The blend amount is more preferably 1.5 parts by mass or more, and is 4.0 parts by mass or less, preferably 3.5 parts by mass or less, more preferably 3.0 parts by mass or less. When the blend amount of the crosslinking agent is in such a range, the pressure-sensitive adhesive layer can gain a cohesive force improving effect without being lowered in pressure-sensitive adhesive force.

The acrylic polymer used as the base polymer of the pressure-sensitive adhesive layer is preferably, for example, a polymer obtained by crosslinking an acrylic polymer I containing the following units with the crosslinking agent (preferably an isocyanate type crosslinking agent): monomer units each originating from a carboxyl-group-containing monomer; monomer units each originating from an alkyl (meth)acrylate (for example, $C_{4-9}$ alkyl acrylate); and monomer units each originating from a hydroxyl-group-containing monomer.

The content (% by mass) of the above-mentioned monomer units each originating from a carboxyl-group-containing monomer in the acrylic polymer I is 3% by mass or more, preferably 4% by mass or more, and is 9% by mass or less, preferably 8% by mass or less of the polymer I. The content (% by mass) of the above-mentioned monomer units each originating from an alkyl (meth)acrylate in the acrylic polymer I is 91% by mass or more, preferably 92% by mass or more by mass, and is 97% by mass or less, preferably 96% by mass or less of the polymer I. The content (% by mass) of the above-mentioned monomer units each originating from a hydroxyl-group-containing monomer in the acrylic polymer I is 0.01% by mass or more, preferably 0.03% by mass or more, more preferably 0.04% by mass, and is 0.1% by mass or less, preferably 0.07% by mass or less, more preferably 0.06% by mass or less by mass of the polymer I. The crosslinking agent used together with the acrylic polymer I is added to the acrylic polymer I in an amount of 0.5 parts by mass or more, preferably 1 part by mass or more, more preferably 1.5 parts by mass or more, and 3 parts by mass or less, preferably 2.5 parts by mass or less based on 100 parts of the acrylic polymer I.

Another example of the acrylic polymer used as the base polymer of the pressure-sensitive adhesive layer is an acrylic polymer II containing the following units: monomer units each originating from a carboxyl-group-containing monomer; monomer units each originating from an alkyl acrylate (for example, $C_{4-9}$ alkyl acrylate); and monomer units each originating from a polyfunctional monomer.

The content (% by mass) of the above-mentioned monomer units each originating from a carboxyl-group-containing monomer in the acrylic polymer II is 4% by mass or more, preferably 5% by mass or more, and is 8% by mass or less, preferably 7% by mass or less of the polymer II. The content (% by mass) of the above-mentioned monomer units each originating from an alkyl (meth)acrylate in the acrylic polymer II is 92% by mass or more, preferably 93% by mass or more, and is 96% by mass or less, preferably 95% by mass or less of the polymer II. The content (% by mass) of the above-mentioned monomer units each originating from a polyfunctional monomer in the acrylic polymer II is 0.01% by mass or more, preferably 0.03% by mass or more, more preferably 0.04% by mass or more, and is 0.1% by mass or less, preferably 0.07% by mass or less, more preferably 0.06% by mass or less of the polymer II.

As required, the pressure-sensitive adhesive composition may contain one or more additives. Examples thereof include a crosslinking aid, a pressure-sensitive adhesiveness supplier (such as rosin derivative resin, polyterpene resin, petroleum resin, or oil-soluble phenolic resin), a plasticizer, a filler, an antiaging agent, a surfactant, and a colorant. The additives may be used singly or in any combination of two or more thereof.

The thickness of the pressure-sensitive adhesive layer is, for example, 15 μm or more, preferably 20 μm or more, and is 200 μm or less, preferably 150 μm or less, more preferably 100 pm or less, even more preferably 50 μm or less from the viewpoint of the adhesiveness of this layer.

When the pressure-sensitive adhesive sheet has two pressure-sensitive adhesive layers, these layers may be equal to or different from each other in thickness.

The content (% by mass) of the base polymer in the pressure-sensitive adhesive layer is, for example, 50% by mass or more, preferably 60% by mass or more, more preferably 75% by mass or more, and 100% by mass or less, preferably 99.9% by mass or less, more preferably 99% by mass or less based on the total mass (corresponding to 100% by mass) of the pressure-sensitive adhesive layer. When the content of the base polymer is in such a range, the pressure-sensitive adhesive layer easily ensures a sufficient pressure-sensitive adhesive force to an adherend.

The weight-average molecular weight (Mw) of the base polymer used in the pressure-sensitive adhesive composition is not particularly limited as far as the attainment of the object of the present invention is not hindered. The weight-average molecular weight is, for example, $1.5 \times 10^5$ or more, preferably $1.7 \times 10^5$ or more, and is $3.0 \times 10^6$ or less, preferably $2.0 \times 10^6$ or less, more preferably $1.5 \times 10^6$ or less. When the weight-average molecular weight (Mw) of the base polymer is in such a range, the pressure-sensitive adhesive layer is restrained from being peeled from an adherend at a high temperature (for example, 80° C. or higher), and ensures an initial adhesiveness.

When the base polymer includes an acrylic polymer, the weight-average molecular weight (Mw) thereof is, for example, $1.5 \times 10^5$ or more, preferably $1.7 \times 10^5$ or more, more preferably $2.5 \times 10^5$ or more, even more preferably $5.0 \times 10^5$, and is $3.0 \times 10^6$ or less, preferably $2.0 \times 10^6$ or less, more preferably $1.5 \times 10^6$ or less.

In the present specification, the weight-average molecular weight is a value in terms of that of polystyrene that is obtained by a GPC (gel permeation chromatographic) method that will be detailed later.

The pressure-sensitive adhesive composition may be a composition containing, as an essential component, the above-defined base polymer, or a composition containing, as an essential component, a mixture of monomers that are to form the base polymer (hereinafter, the mixture will be referred to as the monomer mixture). When the essential component of the pressure-sensitive adhesive composition is the monomer mixture, the composition may contain a partially polymerized product in which the monomer is partially polymerized.

Although the monomer mixture is varied in accordance with the species of the monomer and the composition ratio between the monomers, and other factors, the mixture is usually in a liquid form. Thus, for example, in order to heighten the viscosity of the monomer mixture to be improved in workability (handleability), the monomer contained in the pressure-sensitive adhesive composition (monomer mixture) may be partially polymerized to be made into a partially polymerized product. The partially-polymerized-product-containing pressure-sensitive adhesive composition (monomer mixture) is in a syrup state. Unreacted fractions of the monomer component in the pressure-sensitive adhesive composition are finally polymerized.

The polymerization rate of the partially polymerized product is set to, for example, 5% by mass or more, preferably 7% by mass or more, and is set to 15% by mass or less, preferably 10% by mass or less. The polymerization rate of the partially polymerized product is appropriately adjustable, for example, by grasping a correlative relationship between the viscosity of the pressure-sensitive adhesive composition and the polymerization rate of the partially polymerized product in advance, and then adjusting the viscosity of the pressure-sensitive adhesive composition on the basis of the correlative relationship. The partially polymerized product is to be finally included, as one portion of the base polymer, in the pressure-sensitive adhesive layer.

When the essential component of the pressure-sensitive adhesive composition is the base polymer, the pressure-sensitive adhesive composition is preferably of a solution type (solvent type). The solution type pressure-sensitive adhesive composition may contain, as its polymerization initiator, a thermopolymerization initiator or a photopolymerization initiator. In the case of the solution type pressure-sensitive adhesive composition, the polymerization initiator is preferably a thermopolymerization initiator from the viewpoint of working-efficiency for forming the pressure-sensitive adhesive layer, and other factors.

When the essential component of the pressure-sensitive adhesive composition is the monomer mixture, the pressure-sensitive adhesive composition is preferably of a solvent-free type. The solvent-free type pressure-sensitive adhesive composition may contain, as its polymerization initiator, a thermopolymerization initiator or a photopolymerization initiator. In the case of the solvent-free type pressure-sensitive adhesive composition, the polymerization initiator is preferably a photopolymerization initiator from the viewpoint of working-efficiency for forming the pressure-sensitive adhesive layer, and other factors.

In the case of using, as a monomer in the solvent-free type pressure-sensitive adhesive composition, a polyfunctional monomer, the polyfunctional monomer may be blended into the monomer mixture before a partially polymerized product is produced, or blended into the monomer mixture after a partially polymerized product is produced. From the viewpoint of, for example, surely heightening cohesive property of the pressure-sensitive adhesive layer, it is preferred to blend the polyfunctional monomer into the monomer mixture after the production of the partially polymerized product.

A method for forming the pressure-sensitive adhesive layer is not particularly limited, and is appropriately selectable from known pressure-sensitive-adhesive-layer-forming methods.

An example of the method for forming the pressure-sensitive adhesive layer using, for example, a solution type pressure-sensitive adhesive composition is a method of applying the pressure-sensitive adhesive composition onto a predetermined substrate layer to give a predetermined thickness after the resultant is to be dried, and then radiating light (radiating ultraviolet rays or any other active energy ray) to the resultant or heating the resultant to cure the composition-applied product (direct layer-forming method). Another example of the method is a method of applying the pressure-sensitive adhesive composition onto a suitable peeling liner to give a predetermined thickness after the resultant is to be dried, radiating light (radiating ultraviolet rays or any other active energy ray) to the resultant or heating the resultant to cure the composition-applied product, thereby forming the pressure-sensitive adhesive layer, and subsequently transferring (or shifting) the pressure-sensitive adhesive layer onto a predetermined substrate layer (transferring method).

An example of the method for forming the pressure-sensitive adhesive layer using a solvent-free type pressure-sensitive adhesive composition is a method of applying the pressure-sensitive adhesive composition, into a layer form, onto a suitable support such as a predetermined substrate layer or peeling liner, and then applying a curing step to the layer-form composition-applied product. As required, before or after the curing step, a drying step may be performed.

When the solvent-free type pressure-sensitive adhesive composition contains a thermopolymerization initiator as a polymerization initiator, the pressure-sensitive adhesive composition is heated to be cured by the start of polymerization reaction. In contrast, when the solvent-free type pressure-sensitive adhesive composition contains a photopolymerization initiator as a polymerization initiator, the pressure-sensitive adhesive composition is irradiated with ultraviolet rays or any other active energy ray to be cured (photo-cured) by the start of polymerization reaction. The active energy ray may be radiated to the layer-form composition-applied product (pressure-sensitive adhesive composition) from a single side or both sides thereof. When the pressure-sensitive adhesive composition is cured in this way, a pressure-sensitive adhesive layer usable in the pressure-sensitive adhesive sheet is obtained.

When the curing (photo-curing) is attained by the active energy ray, a known or conventional oxygen-blocking method may be appropriately performed in order for oxygen in the air not to hinder the polymerization reaction. The oxygen-blocking method is, for example, a method of bonding an appropriate support such as a peeling liner or a substrate layer onto the layer-form composition-applied product (pressure-sensitive adhesive composition); or of conducting the photo-curing reaction in the atmosphere of nitrogen.

For the application of the pressure-sensitive adhesive composition, a conventional applicator is usable, examples thereof including a gravure roll coater, a reverse roll coater, a kiss roll coater, a dip roll coater, a bar coater, a knife coater, and a spray coater.

The storage modulus (at 23° C.) of the pressure-sensitive adhesive layer is 250 kPa or less, preferably 220 kPa or less, more preferably 200 kPa or less, and is preferably 12 kPa or more, more preferably 20 kPa or more, even preferably 30 kPa or more. When the storage modulus (at 23° C.) of the pressure-sensitive adhesive layer is in such a range, the pressure-sensitive adhesive layer is not easily peeled from an adherend even at a high temperature while keeping softness. When the pressure-sensitive adhesive layer is soft, this layer can adhere closely to fine irregularities in the surface of the adherend without making any gap so that the pressure-sensitive adhesive sheet keeps airtight performance.

A surface tension of the pressure-sensitive adhesive layer is not particularly limited, and is, for example, 20 dyn/cm or more, preferably 22 dyn/cm or more, and is 60 dyn/cm or less, preferably 55 dyn/cm or less. The surface tension of the pressure-sensitive adhesive layer is measured by a method (droplet method) that will be described later.

Peeling Liner

In the pressure-sensitive adhesive sheet before the use thereof, the outer surface (pressure-sensitive adhesive surface) of the pressure-sensitive adhesive layer is protected by a peeling liner. The peeling liner is appropriately selected from known peeling liners so as to be usable. When the pressure-sensitive adhesive sheet is used in the state of being bonded to a hard disc drive (magnetic disc device) or some other, it is preferred to use a non-silicone peeling liner, in which no silicone peeling treatment agent is used, since the use of a silicone peeling liner causes the generation of a siloxane compound (siloxane gas) such as a cyclic siloxane, which causes a trouble of the hard disc drive or the other.

The non-silicone peeling liner is not particularly limited as far as the liner is a liner in which no silicone peeling treatment agent is used. The liner may be, for example, a substrate having a peeling layer, such as a plastic film or paper piece, surface-treated with a peeling agent such as a long-chain alkyl or fluorine-contained agent, or molybdenum sulfide; a low-boding-property substrate made of a fluorine-contained polymer such as polytetrafluoroethylene, polychlorotrifluoroethylene, polyvinyl fluoride, polyvinylidene fluoride, tetrafluoroethylene/hexafluoropropylene copolymer, or chlorofluoroethylene/vinylidene fluoride; or a low-bonding-property substrate made of a nonpolar polymer such as an olefin resin (such as polyethylene or polypropylene). Out of these examples, preferred is a peeling liner having a peeling-treatment-surface-side film layer made of an olefin resin (polyolefin peeling liner), and particularly preferred is a peeling liner having a peeling-treatment-surface-side film layer made of polyethylene (polyethylene peeling liner). It is sufficient for the polyolefin peeling liner to be a liner in which a layer that forms a surface of this liner which contacts the pressure-sensitive adhesive surface is made of a polyolefin resin. Thus, the liner may be, for example, a laminated film of a polyester resin and a polyolefin resin.

When the generation of a siloxane compound causes no problem, a peeling liner other than non-silicone peeling liners may be used.

When the pressure-sensitive adhesive sheet is used to isolate a helium gas filled container having a pressure of 3000 Pa and a pressure container having a pressure of 1 Pa from each other, the proportion of the helium gas which leaks (helium leak rate) from the helium gas filled container to the pressure container is less than $1 \times 10^{-9}$ Pa·m³/s. A method for measuring the helium leak rate will be described later. The helium leak rate of the pressure-sensitive adhesive sheet is preferably less than $0.5 \times 10^{-9}$ Pa·m³/s, more preferably less than $0.3 \times 10^{-9}$ Pa·m³/s, even more preferably less than $0.1 \times 10^{-9}$ Pa·m³/s. When the helium leak rate of the pressure-sensitive adhesive sheet is in such a range, the airtight performance of the pressure-sensitive adhesive sheet is excellent. A specific method for measuring the helium leak rate will be described later.

In the pressure-sensitive adhesive sheet, the 180°-peel pressure-sensitive adhesive force of the pressure-sensitive adhesive layer from a stainless steel plate is preferably 5 N/20-mm or more, more preferably 10 N/20-mm or more. When this 180°-peel pressure-sensitive adhesive force is in such a range, the pressure-sensitive adhesive sheet has a sufficient pressure-sensitive adhesive force.

When the pressure-sensitive adhesive layer of the pressure-sensitive adhesive sheet is heated at 130° C. for 30 minutes, the amount of generated gas is preferably less than 6000 ng/cm², more preferably less than 1200 ng/cm², even more preferably less than 350 ng/cm². When this generated gas amount (heating-generated gas amount) is in such a range, the pressure-sensitive adhesive sheet can be favorably used even when the generated gas becomes a problem (for example, when the pressure-sensitive adhesive sheet is used in a precision instrument such as a magnetic disc device). A method for measuring the generated gas amount (heating-generated gas amount) will be described later.

About the pressure-sensitive adhesive sheet, the following peel distance thereof is preferably less than 50 mm, more preferably less than 10 mm, even more preferably less than 6 mm: the peel distance of the sheet in a 100-g-constant-load peeling test at 23° C. after 24 hours from a time when the test is started. When this peel distance is in such a range, the pressure-sensitive adhesive sheet can keep a long-term bonding-property reliability to keep an excellent airtight performance A method for measuring the peel distance will be described later.

About the pressure-sensitive adhesive sheet, the deviation amount thereof is less than 1.0 mm as has been described above, this amount being the deviation amount of the sheet per 250 gf/cm² of the sheet in a holding ability test at 80° C. after one hour from a time when the test is started. The deviation amount is preferably less than 0.6 mm, more preferably less than 0.4 mm When the deviation amount is in such a range, the pressure-sensitive adhesive sheet is not easily peeled from an adherend even at a high temperature to keep airtight performance. A method for measuring the deviation amount will be described later.

About the pressure-sensitive adhesive sheet, the probe tack thereof at 23° C. is preferably 20 kN/m² or more, more preferably 25 kN/m² or more, even more preferably 30 kN/m² or more. When the pressure-sensitive adhesive sheet is bonded to an adherend, the probe tack in such a range makes it easy that the pressure-sensitive adhesive layer adheres closely to fine irregularities in the surface of the adherend without making any gap.

Usage of Pressure-Sensitive Adhesive Sheet

The pressure-sensitive adhesive sheet can be favorably used for, e.g., an adherend for which airtight performance is required. The pressure-sensitive adhesive sheet can be used as, e.g., a cover seal in a hard disc drive (magnetic disc device), a sealing seal for covering various holes (openings) made in a hard disc drive, or a fixing member for a component (member), such as an electronic component (electronic member) or housing which constitutes a hard disc drive.

The sealing sheet can be used for vibration control, sound absorption, and other various purposes other than sealing and fixing purposes. The pressure-sensitive adhesive sheet may be used as a display label. The pressure-sensitive adhesive sheet can be favorably used in a precision instrument other than hard disc drives.

The pressure-sensitive adhesive sheet may be used to seal, for example, a slight gap made in a part (such as a joint) through which pipes such as gas pipes are connected to each other.

Adherend

A raw material making the adherend to which the pressure-sensitive adhesive sheet is bonded is not particularly limited, and is preferably, for example, a metal (for example, aluminum), an alloy (for example, stainless steel), or a member having a surface covered with a metal or alloy (for example, a cation electrodeposited product) for, e.g., the reason that performances of the pressure-sensitive adhesive sheet are easily exhibited.

In the present specification, the adherend to which the pressure-sensitive adhesive sheet is bonded is referred to, particularly, as the "pressure-sensitive-adhesive-sheet-attached adherend". Examples of the pressure-sensitive-adhesive-sheet-attached adherend include a hard disc drive to which the pressure-sensitive adhesive sheet is attached as a cover seal, and pipes having a joint sealed with the pressure-sensitive adhesive sheet.

The surface of the adherend may be a flat surface or an uneven surface. When the arithmetic average roughness (Ra) of the surface of the adherend is 0.5 μm or less and the ten-point average roughness (Rz) thereof is 7 μm or less, the pressure-sensitive adhesive sheet is not peeled from the adherend even at a high temperature so that the sheet can keep adhesiveness (airtight performance).

The present invention can provide a pressure-sensitive adhesive sheet which is not easily peeled from an adherend even under high-temperature conditions to be excellent in airtight performance (1) A pressure-sensitive adhesive sheet, including a pressure-sensitive adhesive layer, and a substrate layer configured to support the pressure-sensitive adhesive layer, the pressure-sensitive adhesive layer having a storage modulus of 250 kPa or less at 23° C., the substrate layer having an elastic modulus of 1680 N/cm to 3000 N/cm both inclusive, and the pressure-sensitive adhesive sheet showing a deviation amount less than 1.0 mm, the amount being the deviation amount of the pressure-sensitive adhesive sheet per 250 gf/cm$^2$ of the sheet in a holding ability test at 80° C. after one hour from a time when the test is started.

(2) In the pressure-sensitive adhesive sheet, it is preferred that the pressure-sensitive adhesive layer has a probe tack of 20 kN/m$^2$ or more at 23° C.

(3) In the pressure-sensitive adhesive sheet, it is preferred that the pressure-sensitive adhesive layer has a storage modulus of 12 kPa or more at 23° C.

(4) In the pressure-sensitive adhesive sheet, it is preferred that the pressure-sensitive adhesive layer has a thickness of 15 μm or more.

(5) In the pressure-sensitive adhesive sheet, it is preferred that the pressure-sensitive adhesive layer has a surface tension of 20 dyn/cm or more.

(6) In the pressure-sensitive adhesive sheet, it is preferred that the substrate layer has a thickness of 10 μm to 100 μm both inclusive.

(7) In the pressure-sensitive adhesive sheet, it is preferred that the pressure-sensitive adhesive layer has a thickness of 200 μm or less.

(8) In the pressure-sensitive adhesive sheet, it is preferred that the pressure-sensitive adhesive layer has a surface tension of 60 dyn/cm or less.

(9) In the pressure-sensitive adhesive sheet, it is preferred that the pressure-sensitive adhesive layer includes at least one selected from the group consisting of acrylic polymers, ester polymers, and rubber polymers.

(10) In the pressure-sensitive adhesive sheet, it is preferred that the substrate layer includes one selected from the group consisting of a plastic layer, a metallic layer and a composite layer including the two layers.

(11) About the pressure-sensitive adhesive sheet, it is preferred that when the pressure-sensitive adhesive sheet is used to isolate a helium gas filled container having a pressure of 3000 Pa and a pressure container having a pressure of 1 Pa from each other, the proportion of the helium gas which leaks from the helium gas filled container to the pressure container is less than $1 \times 10^{-9}$ Pa·m$^3$/s.

(12) The pressure-sensitive adhesive sheet preferably shows a peel distance less than 50 mm, the distance being the peel distance of the sheet in a 100-g-constant-load peeling test at 23° C. after 24 hours from a time when the test is started.

(13) In the pressure-sensitive adhesive sheet, it is preferred that the pressure-sensitive adhesive layer has a 180°-peel pressure-sensitive adhesive force of 5 N/20 mm or more from a stainless steel plate.

(14) The pressure-sensitive adhesive sheet preferably shows a generated gas amount less than 6000 ng/cm$^2$ when the pressure-sensitive adhesive layer is heated at 130° C. for 30 minutes.

(15) In the pressure-sensitive adhesive sheet, it is preferred that the substrate layer is a composite substrate layer having the plastic film layer, and the total thickness of the plastic film layer is 50% or more of the thickness of the substrate layer.

(16) In the pressure-sensitive adhesive sheet, it is preferred that the thickness of the pressure-sensitive adhesive layer is 80 μm or less.

(17) In the pressure-sensitive adhesive sheet, it is preferred that the pressure-sensitive adhesive layer includes, as a base polymer, an acrylic polymer.

(18) In the pressure-sensitive adhesive sheet, it is preferred that when the pressure-sensitive adhesive layer is heated at 130° C. for 30 minutes, the amount of generated gas is 1200 ng/cm$^2$ or less.

(19) In the pressure-sensitive adhesive sheet, it is preferred that when the pressure-sensitive adhesive layer is heated at 130° C. for 30 minutes, the amount of generated gas is 350 ng/cm$^2$ or less.

(20) In the pressure-sensitive adhesive sheet, it is preferred that the pressure-sensitive adhesive layer has a storage modulus of 50 kPa or less at 23° C.

(21) In the pressure-sensitive adhesive sheet, it is preferred that the acrylic polymer includes 70% by mass or more of an alkyl (meth)acrylate as monomer units.

(22) In the pressure-sensitive adhesive sheet, it is preferred that the alkyl (meth)acrylate is at least one selected from the group consisting of n-butyl acrylate and 2-ethylhexyl acrylate.

(23) In the pressure-sensitive adhesive sheet, it is preferred that the acrylic polymer includes 2% by mass to 8% by mass both inclusive of a carboxyl-group-containing monomer as monomer units.

(24) In the pressure-sensitive adhesive sheet, it is preferred that the pressure-sensitive adhesive layer includes an isocyanate type crosslinking agent.

(25) In the pressure-sensitive adhesive sheet, it is preferred that the isocyanate type crosslinking agent is blended into the base polymer in an amount of 1.5 parts by mass to 4.0 parts by mass both inclusive based on 100 parts by mass of the base polymer.

(26) In the pressure-sensitive adhesive sheet, it is preferred that the acrylic polymer includes a polyfunctional monomer as monomer units in a proportion more than 0% by mass and 0.1% by mass or less.

(27) A pressure-sensitive-adhesive-sheet-attached adherend includes a surface having an arithmetic average roughness (Ra) of 0.5 μm or less and having a ten-point average roughness (Rz) of 7 μm or less, and the above-mentioned pressure-sensitive adhesive sheet being bonded to an adherend.

(28) In the pressure-sensitive-adhesive-sheet-attached adherend, it is preferred that the adherend includes at least one selected from the group consisting of stainless steel, aluminum and a cation electrodeposited product.

EXAMPLES

Hereinafter, the present invention will be described in more detail by way of working examples thereof. However, the invention is never limited by these examples.

Example 1

Production of Substrate Layer "a"

A laminating manner based on dry laminating bonding was used to produce a substrate layer "a" having a structure in which a PET film layer (thickness: 25 μm), an aluminum layer (thickness: 7 μm), and a PET film layer (thickness: 9

μm) were located in this order from the front side of the structure to the rear side thereof. Between each of the PET layers and the aluminum layer, a bonding layer (thickness: 2.5 μm) was interposed. The total thickness of the substrate layer "a" was 46 μm.

Preparation of Pressure-Sensitive Adhesive Composition A

A four-neck flask equipped with stirring fans, a thermostat, a nitrogen-gas introducing pipe, a condenser and a dropping funnel were charged 5 parts by mass of acrylic acid (AA), 95 parts by mass of 2-ethylhexyl acrylate (2EHA) and 0.05 parts by mass of 4-hydroxybutyl acrylate (4HBA), using 100 parts by mass of ethyl acetate as a solvent. These components were stirred at 70° C. under nitrogen for 1 hour, and then thereto was added 0.1 parts by mass of azobisisobutyronitrile as a thermopolymerization initiator to cause the reactive components to react with each other at 57° C. for 5 hours. Subsequently, the components were caused to react with each other at 75° C. for 2 hours. After the reaction, 200 parts by mass of ethyl acetate were added thereto to yield a solution of an acrylic polymer having a weight-average molecular weight of 1200000 (solid concentration: 25% by mass). Into this solution were blended 2 parts by mass (in terms of the solid amount) of an isocyanate type crosslinking agent (trade name: "CORONATE L", manufactured by Nippon Polyurethane Industry Co., Ltd.): tolylene diisocyanate adduct of trimethylolpropane; solid concentration: 75% by mass) to yield a solution-state pressure-sensitive adhesive layer composition A. In Tables 1-1 and 1-2 shown later, the isocyanate type crosslinking agent "CORONATE L" is shown as "CL".

The weight-average molecular weight (Mw) of the acrylic polymer was a value in terms of that of standard polystyrene that was obtained by GPC (gel permeation chromatography). The used GPC instrument was an instrument "HLC-8320 GPC (name)" (manufactured by Tosoh Corporation; column: TSK gel GMH-H). Also in the working examples and comparative examples that will be described hereinafter, the respective weight-average molecular weights (Mw) of polymers were obtained using GPC in the same manner.

Production of Pressure-Sensitive Adhesive Sheet

The pressure-sensitive adhesive composition A was applied onto the outer surface of the PET film layer positioned at the rear side of the substrate layer "a" to give a thickness of 30 μm after the applied composition would be dried. The applied composition A was dried at 120° C. for 3 minutes to yield a pressure-sensitive adhesive sheet of Example 1 in which a pressure-sensitive adhesive layer was formed on the substrate layer "a". A peeling liner made of a thermoplastic film subjected to release treatment and embossing treatment (trade name: "SFL-70T2", manufactured by Sun A. Kaken Co., Ltd.; thickness: 70 μm) was bonded onto the outer surface (pressure-sensitive adhesive surface) of the pressure-sensitive adhesive layer. Also in the working examples and comparative examples that will be described hereinafter, the same peeling liner was bonded to the pressure-sensitive adhesive surface of the pressure-sensitive adhesive sheet.

Example 2

Preparation of Pressure-Sensitive Adhesive Composition B

Solution polymerization was conducted in the same way as in Example 1 except that the blend amount of acrylic acid (AA) was changed to 7 parts by mass, and further 93 parts by mass of butyl acrylate (BA) was used instead of 2-ethylhexyl acrylate (2EHA) to yield a solution of an acrylic polymer having a weight-average molecular weight of 1200000 (solid concentration: 25% by mass). In the same manner as in Example 1, into the solution were blended 2 parts by mass (in terms of the solid amount) of the isocyanate type crosslinking agent (tolylene diisocyanate adduct of trimethylolpropane; solid concentration: 75% by mass) to yield a solution-state pressure-sensitive adhesive layer composition B.

Production of Pressure-Sensitive Adhesive Sheet

Prepared was the same substrate layer "a" as in Example 1, and the pressure-sensitive adhesive composition B was applied onto the outer surface of the PET film layer positioned at the rear side of the substrate layer "a" to give a thickness of 30 μm after the applied composition would be dried. The applied composition B was dried at 120° C. for 3 minutes to yield a pressure-sensitive adhesive sheet of Examples 2 in which a pressure-sensitive adhesive layer was formed on the substrate layer "a".

Example 3

As a substrate layer "b", an aluminum foil piece having a thickness of 20 μm was prepared. The same pressure-sensitive adhesive composition B as in Example 2 was applied onto a single surface of the substrate layer "b" to give a thickness of 30 μm after the applied composition would be dried. The applied composition B was dried at 120° C. for 3 minutes to form a pressure-sensitive adhesive layer onto the substrate layer "b", thereby yielding a pressure-sensitive adhesive sheet of Example 3.

Example 4

As a substrate layer "c", prepared was an aluminum-evaporated PET film (thickness: 50 pm) in which an aluminum-evaporated layer was formed on a single surface of a PET film. The same pressure-sensitive adhesive composition B as in Example 2 was applied onto a single surface (aluminum-evaporated layer) of the substrate layer "c" to give a thickness of 30 μm after the applied composition would be dried. The applied composition B was dried at 120° C. for 3 minutes to form a pressure-sensitive adhesive layer onto the substrate layer "c", thereby yielding a pressure-sensitive adhesive sheet of Example 4.

Comparative Example 1

Preparation of Pressure-Sensitive Adhesive Composition C

A solution-state pressure-sensitive adhesive composition C was yielded in the same way as in Example 1 except that the blend amount of the isocyanate type crosslinking agent ("CORONATE L"; solid concentration: 75% by mass) was changed to 5 parts by mass.

Production of Pressure-Sensitive Adhesive Sheet

Prepared was the same substrate layer "a" as in Example 1. The pressure-sensitive adhesive composition C was applied onto the outer surface of the PET film layer positioned at the rear side of the substrate layer "a" to give a thickness of 30 μm after the applied composition would be dried. The applied composition C was dried at 120° C. for 3 minutes to yield a pressure-sensitive adhesive sheet of Comparative Example 1 in which a pressure-sensitive adhesive layer was formed on the substrate layer "a".

Comparative Example 2

Preparation of Pressure-Sensitive Adhesive Composition D

A solution-state pressure-sensitive adhesive composition D was yielded in the same way as in Example 1 except that the blend amount of the isocyanate type crosslinking agent ("CORONATE L"; solid concentration: 75% by mass) was changed to 1 part by mass.

Production of Pressure-Sensitive Adhesive Sheet

Prepared was the same substrate layer "a" as in Example 1. The pressure-sensitive adhesive composition D was applied onto the outer surface of the PET film layer positioned at the rear side of the substrate layer "a" to give a thickness of 30 µm after the applied composition would be dried. The applied composition D was dried at 120° C. for 3 minutes to yield a pressure-sensitive adhesive sheet of Comparative Example 2 in which a pressure-sensitive adhesive layer was formed on the substrate layer "a".

Comparative Example 3

Preparation of Pressure-Sensitive Adhesive Sheet

Prepared was the same substrate layer "a" as in Example 1. The same pressure-sensitive adhesive composition B as in Example 2 was applied onto the outer surface of the PET film layer positioned at the rear side of the substrate layer "a" to give a thickness of 10 µm after the applied composition would be dried. The applied composition B was dried at 120° C. for 3 minutes to yield a pressure-sensitive adhesive sheet of Comparative Example 3 in which a pressure-sensitive adhesive layer was formed on the substrate layer "a".

Comparative Example 4

As a substrate layer "d", a PET film having a thickness of 50 µm was prepared. The same pressure-sensitive adhesive composition B as in Example 2 was applied onto a single surface of the substrate layer "d" to give a thickness of 30 µm after the applied composition would be dried. The applied composition B was dried at 120° C. for 3 minutes to form a pressure-sensitive adhesive layer onto the substrate layer "d", thereby yielding a pressure-sensitive adhesive sheet of Comparative Example 4.

Comparative Example 5

As a substrate layer "e", an aluminum foil piece having a thickness of 50 µm was prepared. The same pressure-sensitive adhesive composition B as in Example 2 was applied onto a single surface of the substrate layer "e" to give a thickness of 30 µm after the applied composition would be dried. The applied composition B was dried at 120° C. for 3 minutes to form a pressure-sensitive adhesive layer onto the substrate layer "e", thereby yielding a pressure-sensitive adhesive sheet of Comparative Example 5.

Example 5

Preparation of Pressure-sensitive Adhesive Composition E (Rubber-based)

The following were stirred and mixed with each other to produce a solution-state pressure-sensitive adhesive composition E: 100 parts by mass of styrene-isoprene block copolymer (weight-average molecular weight: 170000); 2 parts by mass (in terms of the solid amount) of the same isocyanate type crosslinking agent ("CORONATE L"; solid concentration: 75% by mass) as in Example 1; and toluene as a solvent.

Preparation of Pressure-Sensitive Adhesive Sheet

Prepared was the same substrate layer "a" as in Example 1. The pressure-sensitive adhesive composition E was applied onto the outer surface of the PET film layer positioned at the rear side of the substrate layer "a" to give a thickness of 30 µm after the applied composition would be dried. The applied composition E was dried at 120° C. for 3 minutes to yield a pressure-sensitive adhesive sheet of Example 5 in which a pressure-sensitive adhesive layer was formed on the substrate layer "a".

Example 6

Preparation of Syrup

Into a liquid monomer mixture made of 6 parts by mass of acrylic acid (AA) that were mixed with 94 parts by mass of 2-ethylhexyl acrylate (2EHA) were blended 0.05 parts by mass of 2,2-dimethoxy-1,2-diphenylethane-1-one (trade name: "IRGACURE 651", manufactured by BASF Japan Ltd.) and 0.05 parts by mass of 1-hydroxycyclohexyl phenyl ketone (trade name: "IRGACURE 184", manufactured by BASF Japan Ltd.) as photopolymerization initiators. The resultant was then irradiated with ultraviolet rays until the viscosity thereof (according to a BH viscometer with a No. 5 rotor at 10 rpm and a measuring temperature of 30° C.) turned to about 15 Pa·s to yield a syrup (AA/2EHA=6/94) containing a partially polymerized product, in which the monomer components were partially polymerized.

Preparation of Pressure-Sensitive Adhesive Composition F

To the syrup (100 parts by mass) was added 0.05 parts by mass of dipentaerythritol hexaacrylate (DPHA) (trade name: "KAYARAD" manufactured by Nippon Kayaku Co., Ltd.) as a crosslinking component (polyfunctional monomer), and these components were mixed with each other to yield a syrup pressure-sensitive adhesive composition F.

(Preparation of Pressure-Sensitive Adhesive Sheet

Prepared was the same substrate layer "a" as in Example 1. The pressure-sensitive adhesive composition F was applied onto the outer surface of the PET film layer positioned at the rear side of the substrate layer "a" to give a thickness of 150 µm after the applied composition would be cured. Thereafter, a peeling liner (trade name: "MRE #38", manufactured by Mitsubishi Plastics, Inc.) was bonded onto the composition F on the substrate layer "a". In this state, ultraviolet rays having an illuminance of 5 mW/cm$^2$ were radiated onto the composition F from both surface sides thereof for 2 minutes to cure the composition F. In this way, a pressure-sensitive adhesive sheet of Example 6 was yielded in which a pressure-sensitive adhesive layer was formed on the substrate layer "a".

Example 7

In the same manner as in Example 6 except that the same substrate layer "a" as in Example 1 was prepared, and the pressure-sensitive adhesive composition F was applied onto the outer surface of the PET film layer positioned at the rear side of the substrate layer "a" to give a thickness of 200 µm after the applied composition would be cured, a pressure-sensitive adhesive sheet of Example 7 was yielded in which a pressure-sensitive adhesive layer was formed on the substrate layer "a".

Comparative Example 6

Preparation of Syrup

In the same manner as in Example 6 except that the blend amount of acrylic acid (AA) was changed to 20 parts by mass, a syrup (AA/2EHA=20/94) was yielded.

Preparation of Pressure-Sensitive Adhesive Composition G

To the syrup (114 parts by mass) of Comparative Example 6 was added 0.05 parts by mass of dipentaerythritol hexaacrylate (DPHA) (trade name: "KAYARAD" manufactured by Nippon Kayaku Co., Ltd.) as a crosslinking component (polyfunctional monomer), and these components were mixed with each other to yield a syrup pressure-sensitive adhesive composition G Production of Pressure-Sensitive Adhesive Sheet Prepared was the same substrate layer "a" as in Example 1. The pressure-sensitive adhesive composition G was applied onto the outer surface of the PET film layer positioned at the rear side of the substrate layer "a" to give a thickness of 30 μm after the applied composition would be cured. Ultraviolet rays having an illuminance of 5 mW/cm² were radiated onto the applied composition G for 2 minutes. In this way, a pressure-sensitive adhesive sheet of Comparative Example 6 was yielded in which a pressure-sensitive adhesive layer was formed on the substrate layer "a".

Comparative Example 7

Preparation of Syrup

In the same manner as in Example 6 except that acrylic acid (AA) was not blended and the blend amount of 2-ethylhexyl acrylate (2EHA) was changed to 100 parts by mass, a syrup (2EHA=100) was yielded.

Preparation of Pressure-Sensitive Adhesive Composition H

To the syrup (100 parts by mass) of Comparative Example 7 was added 0.05 parts by mass of dipentaerythritol hexaacrylate (DPHA) (trade name: "KAYARAD" manufactured by Nippon Kayaku Co., Ltd.) as a crosslinking component (polyfunctional monomer), and these components were mixed with each other to yield a syrup pressure-sensitive adhesive composition H.

Production of Pressure-Sensitive Adhesive Sheet

Prepared was the same substrate layer "a" as in Example 1. The pressure-sensitive adhesive composition H was applied onto the outer surface of the PET film layer positioned at the rear side of the substrate layer "a" to give a thickness of 30 μm after the applied composition would be cured. Thereafter, a peeling liner (trade name: "MRE #38", manufactured by Mitsubishi Plastics, Inc.) was bonded onto the composition H on the substrate layer "a". In this state, ultraviolet rays having an illuminance of 5 mW/cm² were radiated onto the composition H from both surface sides thereof for 2 minutes to cure the composition H. In this way, a pressure-sensitive adhesive sheet of Comparative Example 7 was yielded in which a pressure-sensitive adhesive layer was formed on the substrate layer "a".

Comparative Example 8

Preparation of Syrup

Into a liquid monomer mixture made of 6 parts by mass of N-vinyl-2-pyrrolidone and 82 parts by mass of 2-ethylhexyl acrylate (2EHA) that were mixed with 12 parts by mass of 2-methoxyethyl methacrylate (2MEA) were blended 0.05 parts by mass of 2,2-dimethoxy-1,2-diphenylethane-1-one (trade name: "IRGACURE 651", manufactured by BASF Japan Ltd.) and 0.05 parts by mass of 1-hydroxycyclohexyl phenyl ketone (trade name: "IRGACURE 184", manufactured by BASF Japan Ltd.) as photopolymerization initiators. The resultant was then irradiated with ultraviolet rays until the viscosity thereof (according to a BH viscometer with a No. 5 rotor at 10 rpm and a measuring temperature of 30° C.) turned to about 15 Pa·s to yield a syrup (NVP/2EHA/2MEA=6/82/12) containing a partially polymerized product, in which the monomer components were partially polymerized.

Preparation of Pressure-Sensitive Adhesive Composition I

To the syrup (100 parts by mass) of Comparative Example 8 were added 0.05 parts by mass of dipentaerythritol hexaacrylate (DPHA) (trade name: "KAYARAD" manufactured by Nippon Kayaku Co., Ltd.) as a crosslinking component (polyfunctional monomer), and 250 parts by mass of aluminum hydroxide (trade name: "HYDILITE H-42", manufactured by Showa Denko K. K.; average particle diameter: 1 μm) as a filler, and these components were mixed with each other to yield a syrup pressure-sensitive adhesive composition I.

Prepared was the same substrate layer "a" as in Example 1. The pressure-sensitive adhesive composition I was applied onto the outer surface of the PET film layer positioned at the rear side of the substrate layer "a" to give a thickness of 50 μm after the applied composition would be cured. Thereafter, a peeling liner (trade name: "MRE #38", manufactured by Mitsubishi Plastics, Inc.) was bonded onto the composition I on the substrate layer "a". In this state, ultraviolet rays having an illuminance of 5 mW/cm² were radiated onto the composition I from both surface sides thereof for 2 minutes to cure the composition I. In this way, a pressure-sensitive adhesive sheet of Comparative Example 8 was yielded in which a pressure-sensitive adhesive layer was formed on the substrate layer "a".

Example 8

Preparation of Syrup

Into a liquid monomer mixture made of 6 parts by mass of acrylic acid that were mixed with 94 parts by mass of isooctyl acrylate (iOA) were blended 0.05 parts by mass of 2,2-dimethoxy-1,2-diphenylethane-1-one (trade name: "IRGACURE 651", manufactured by BASF Japan Ltd.) and 0.05 parts by mass of 1-hydroxycyclohexyl phenyl ketone (trade name: "IRGACURE 184", manufactured by BASF Japan Ltd.) as photopolymerization initiators. The resultant was then irradiated with ultraviolet rays until the viscosity thereof (according to a BH viscometer with a No. 5 rotor at 10 rpm and a measuring temperature of 30° C.) turned to about 15•Pa·s to yield a syrup (AA/iOA=6/94) containing a partially polymerized product, in which the monomer components were partially polymerized.

Preparation of Pressure-Sensitive Adhesive Composition J

To the syrup (100 parts by mass) was added 0.05 parts by mass of dipentaerythritol hexaacrylate (DPHA) (trade name: "KAYARAD" manufactured by Nippon Kayaku Co., Ltd.) as a crosslinking component (polyfunctional monomer), and these components were mixed with each other to yield a syrup pressure-sensitive adhesive composition J.

Production of Pressure-Sensitive Adhesive Sheet

Prepared was the same substrate layer "a" as in Example 1. The pressure-sensitive adhesive composition J was applied onto the outer surface of the PET film layer positioned at the rear side of the substrate layer "a" to give a thickness of 150 μm after the applied composition would be cured. Thereafter, a peeling liner (trade name: "MRE #38", manufactured by Mitsubishi Plastics, Inc.) was bonded onto the composition J on the substrate layer "a". In this state, ultraviolet rays having an illuminance of 5 mW/cm² were radiated onto the composition J from both surface sides thereof for 2 minutes to cure the composition J. In this way, a pressure-sensitive adhesive sheet of Example 8 was yielded in which a pressure-sensitive adhesive layer was formed on the substrate layer "a".

Example 9

Preparation of Syrup

In the same manner as in Example 8 except that isooctyl acrylate (iOA) was changed to 94 parts by mass of isononyl acrylate (iNA), a syrup (AA/iNA =20/94) was yielded.

To the syrup (114 parts by mass) of Example 9 was added 0.05 parts by mass of dipentaerythritol hexaacrylate (DPHA) (trade name: "KAYARAD" manufactured by Nippon Kayaku Co., Ltd.) as a crosslinking component (polyfunctional monomer), and these components were mixed with each other to yield a syrup pressure-sensitive adhesive composition K.

Production of Pressure-Sensitive Adhesive Sheet

Prepared was the same substrate layer "a" as in Example 1. The pressure-sensitive adhesive composition K was applied onto the outer surface of the PET film layer positioned at the rear side of the substrate layer "a" to give a thickness of 150 μm after the applied composition would be cured. Thereafter, a peeling liner (trade name: "MRE #38", manufactured by Mitsubishi Plastics, Inc.) was bonded onto the composition K on the substrate layer "a". In this state, ultraviolet rays having an illuminance of 5 mW/cm² were radiated onto the composition K from both surface sides thereof for 2 minutes to cure the composition K. In this way, a pressure-sensitive adhesive sheet of Example 9 was yielded in which a pressure-sensitive adhesive layer was formed on the substrate layer "a".

About the pressure-sensitive adhesive sheet of each of the working examples and the comparative examples, measurements and tests described below were made.

Storage Modulus of Pressure-Sensitive Adhesive Layer

The pressure-sensitive adhesive compositions A to K of the working examples and the comparative examples were each used to produce a pressure-sensitive adhesive layer (thickness: 1000 μm) for measurement. The pressure-sensitive adhesive layer was punched out into a piece having a diameter of 7.9 mm The piece was sandwiched and fixed between parallel plates, and the resultant was used as a measuring sample. About the measuring sample, a dynamic viscoelasticity measuring instrument (trade name: "ARES", manufactured by Rheometric Scientific Inc.) was used to measure the dynamic viscoelasticity thereof under conditions described below, and measured the storage modulus G' at a temperature of 23° C. The measurement results of the respective storage moduli of the pressure-sensitive adhesive layers are shown in Tables 1-1, 1-2, 2-1, and 2-2.

Instrument: ARES (Advanced Rheometric Expansion System, manufactured by Rheometric Scientific Inc.)

Frequency: 1 Hz

Temperature: −40 to 100° C.

Temperature-raising rate: 5° C./minute

Strain: 1%

Surface Tension of Pressure-Sensitive Adhesive Layer

The surface tension of the pressure-sensitive adhesive surface of the pressure-sensitive adhesive sheet was measured on the basis of a standard according to ISO 8296:2003.

A specific method for the measurement is as follows:

A measuring sample cut out from the pressure-sensitive adhesive sheet was put into a standard experimental atmosphere of 23±2° C. and 50±5% humidity. The measuring sample was allowed to stand still on a horizontal and flat plane. An absorbent cotton stick impregnated with a test mixed liquid was horizontally shifted into one direction on the measuring sample. In this way, application was performed one time. The application width was set to about 10 mm Thereafter, under a lamp, a liquid thin membrane made from the mixed liquid was observed. In a case where a sustained period when the liquid thin membrane kept an original state thereof exceeded 2 seconds, a mixed liquid larger in surface tension was used to repeat the same test of a new measuring sample until the sustained period when the liquid thin membrane kept an original state thereof became near to 2 seconds. In a case where the sustained period when the liquid thin membrane kept an original state thereof was less than 2 seconds, a liquid lower in surface tension was used to make the same test to make the sustained period when the liquid thin membrane kept an original state thereof near to 2 seconds. This operation was repeated to select a mixed liquid making it possible to moisten the surface of the corresponding measuring sample precisely in 2 seconds. In each of the tests, a new absorbent cotton stick was used. The selecting operation was made three times, the operation being an operation of selecting the mixed liquid making it possible to moisten the surface of the corresponding measuring sample in 2 seconds. The thus selected mixed liquid was used to measure the surface tension of the pressure-sensitive adhesive surface of the pressure-sensitive adhesive sheet. The used mixed liquids were mixed liquids different from each other step by step in wet tension in accordance with the above-mentioned standard. Specifically, in accordance with the standard, the following were used: mixed liquids prepared by mixing ethylene glycol monoethyl ether, formamide, methanol and water with each other in respective stepwise amounts. The measurement results of the respective surface tensions of the pressure-sensitive adhesive layers are shown in Tables 1-1, 1-2, 2-1 and 2-2.

Elastic Modulus of Substrate Layer

From the peeling-liner-attached pressure-sensitive adhesive sheet of each of the working examples and the comparative examples, a piece 10 mm in width×50 mm in length was cut out. Therefrom, the peeling liner was peeled. The resultant was used as a measuring sample. The upper end in the longitudinal direction of the measuring sample was sandwiched and fixed between parts of an upper-end chuck of a tensile tester. Thereafter, while the position of the measuring sample was adjusted to set the distance between upper-end and lower-end chucks to 20 mm, the measuring sample was sandwiched and fixed between parts of the lower-end chuck. About the fixed measuring sample, a tensile test (stress-strain test) was made at a rate of 50 mm/minute. From the initial inclination of the resultant stress-strain curve, the elastic modulus of the sample was calculated. This value was used as the initial elastic modulus (N/cm) thereof.

Helium Gas Leak Test

Figure 3:
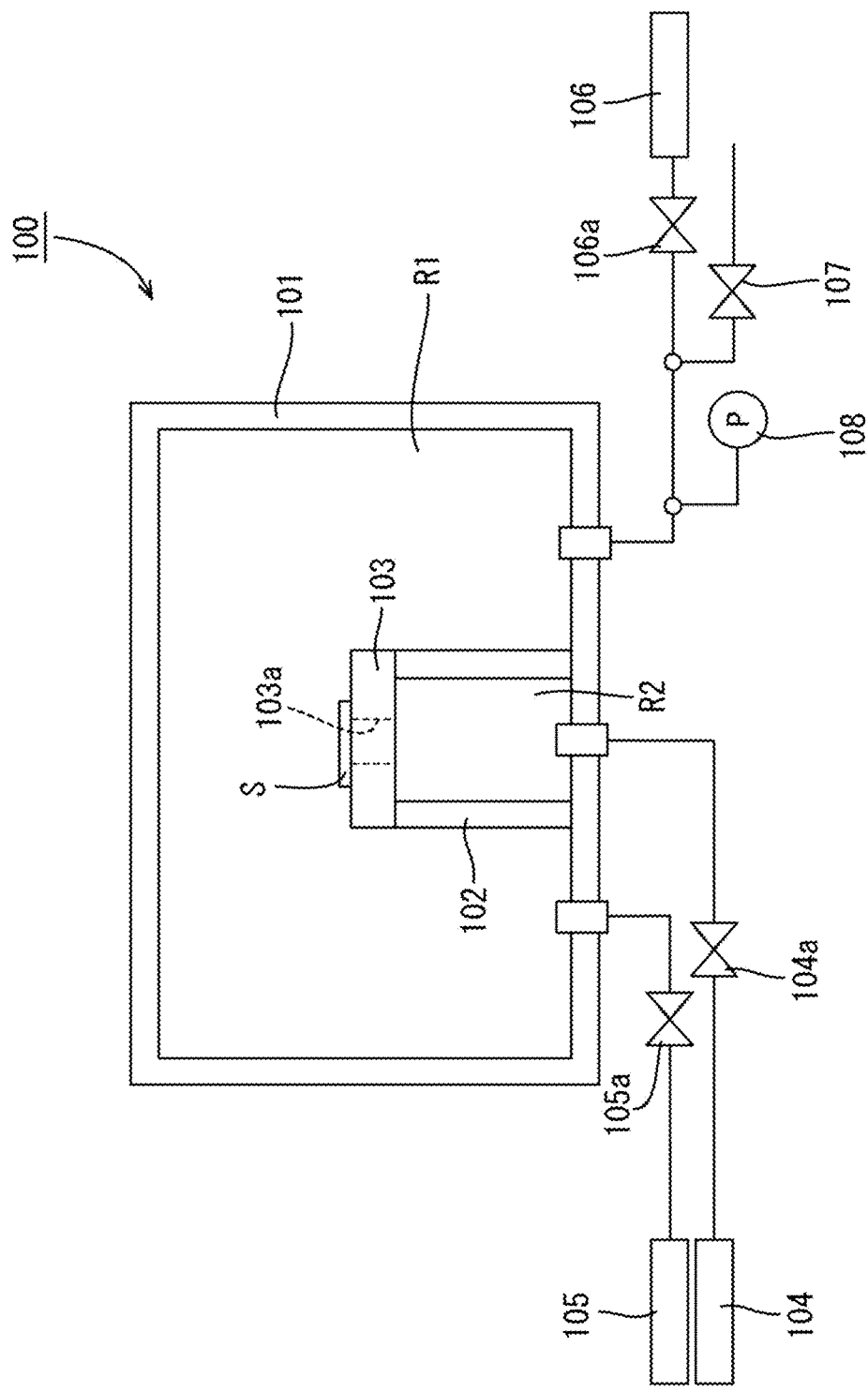
FIG. 3 is a schematic view describing a situation of a helium gas leak test.

About the pressure-sensitive adhesive sheet of each of the working examples and the comparative examples, a test machine 100 illustrated in FIG. 3 was used to make a helium gas leak test. The test machine 100 has a test chamber (helium gas filled container) 101 having therein an airtightly sealed space R1, and a pressure-resistant container (pressure container) 102 set inside the test chamber 101. The pressure-resistant container 102 is made of SUS 304, and is in a cylindrical form. The pressure-resistant container 102 is caused to stand to fix one of its opening ends onto a floor plane of the test chamber 101. The other opening end of the pressure-resistant container 102 is arranged to face the ceiling side of the test chamber 101, and a plate-form stage 103 is located to cover the opening end. A space R2 is a detecting area for the helium gas leak test, this space being surrounded by the cylindrical pressure-resistant container 102, the floor plane of the test chamber 101, and the stage 103. The stage 103 has a through hole (diameter: 5 mm) 103a which penetrates through this stage in the thickness direction thereof and which is connected to the inside of the pressure-resistant container 102. A circular test sample (diameter: 14 mm) S cut out from the pressure-sensitive adhesive sheet was bonded to the stage to cover the through hole 103a.

After the bonding of the test sample S to the stage 103, in the bonding state, the sample was allowed to stand still, and cured for 30 minutes in the test chamber 101 (in the space R1) at a temperature set to 23° C. Thereafter, a helium leak detector (trade name: "MSE-20005", manufactured by SHIMADZU EMIT CO., LTD.) 104 was started up, and the pressure in the detecting area R2 inside the pressure-resistant container 102 was reduced to 1 Pa. The helium leak detector 104 is connected to the detecting area R2. A vacuum pump (not illustrated) which the helium leak detector 104 has was operated to reduce the pressure in the detecting area R2 to give a substantial vacuum state.

Next, a vacuum pump 105 was used to reduce the pressure in the test chamber 101 (in the space R1) to 10 Pa. Thereafter, helium gas was supplied into the test chamber 101 (into the space R1) to give a pressure of 3000 Pa. For the supply of helium gas, a helium gas supplying device (helium gas cylinder) 106 was used which was connected to the test chamber 101.

After 48 hours elapsed from the supply of helium gas into the test chamber 101 (into the space R1), helium gas (helium leak rate (nPa·m$^3$/s)) in the detecting area R2 was detected, using the helium leak detector 104. The respective results of the examples are shown in Tables 1-1, 1-2, 2-1 and 2-2. In FIG. 3, reference number 108 represents a static pressure meter (Pirani vacuum gauge, manufactured by ULVAC, Inc.) showing the pressure in the test chamber 101 (in the space R1); and reference numbers 104a, 105a and 106a, respective represents control valves.

The stage (sample stage) to which the pressure-sensitive adhesive sheet (test sample) was to be bonded was made of aluminum (A5052), and had an arithmetic average surface roughness(Ra) of 450 nm and a ten-point average surface roughness (Rz) of 6500 nm. About each of the surface roughnesses of the stage, an optical profiler (trade name: "NT 9100", manufactured by Veeco Instruments Inc.) was used to make a measurement theree times under the following conditions: measurement type: VSI (infinite scan); objective: 2.5×, FOV: 1.0×; and modulation threshold: 0.1%. Mean value of three measurement values was adopted. After the measurements, data analysis was made, using Terms Removal: Tilt Only (Plane Fit), and Window Filtering: None. In this way, each of the arithmetic average surface roughness (Ra) and the ten-point average surface roughness (Rz) were gained.

180° -Peel Pressure-Sensitive Adhesive Force (from SUS Plate)

From the pressure-sensitive adhesive sheet of each of the working examples and the comparative examples, a measuring sample of 20 mm width×150 mm length was cut out. This measuring sample was pressed and bonded to a stainless steel plate (SUS: 304BA) by a method of reciprocating a roller of 2 kg weight once on the plate. The resultant was then allowed to stand still in an atmosphere of 23° C. for 20 minutes. Thereafter, in accordance with JIS Z 0237, a tensile tester (trade name: "TENSILON", manufactured by SHIMADZU CORPORATION) was used to peel the pressure-sensitive adhesive sheet at a tensile rate of 300 mm/minute and a peel angle of 180° (measuring environment: a temperature of 23° C. and a humidity of 50% RH). A force (180° -peel pressure-sensitive adhesive force) (N/20-mm) required for the peeling was measured. The measurement results of the examples are shown in Tables 1-1, 1-2, 2-1 and 2-2.

Heating-Generated Gas Test

The heating-generated gas amount of the pressure-sensitive adhesive sheet of each of the working examples and the comparative examples was measured by a dynamic heat space method. The measuring method is specifically as follows. From the pressure-sensitive adhesive sheet, a 7-cm$^2$-size piece was cut out, and this piece was used as a measuring sample. The measuring sample was sealed into a 50-mL vial, and this was heated at 120° C. for 10 minutes, using a head space auto-sampler (trade name: "EQ-12031 HAS", manufactured by JEOL Ltd. The total amount (heating-generated gas amount) of gas generated from the measuring sample was measured, using a gas chromatograph/mass spectrometer (GC-MS). The heating-generated gas amount is the amount of gas generated per unit area (unit: ng/cm$^2$) of the pressure-sensitive adhesive sheet. The measurement results of the examples are shown in Tables 1-1, 1-2, 2-1 and 2-2.

Constant-Load Peeling Test

Figure 4:
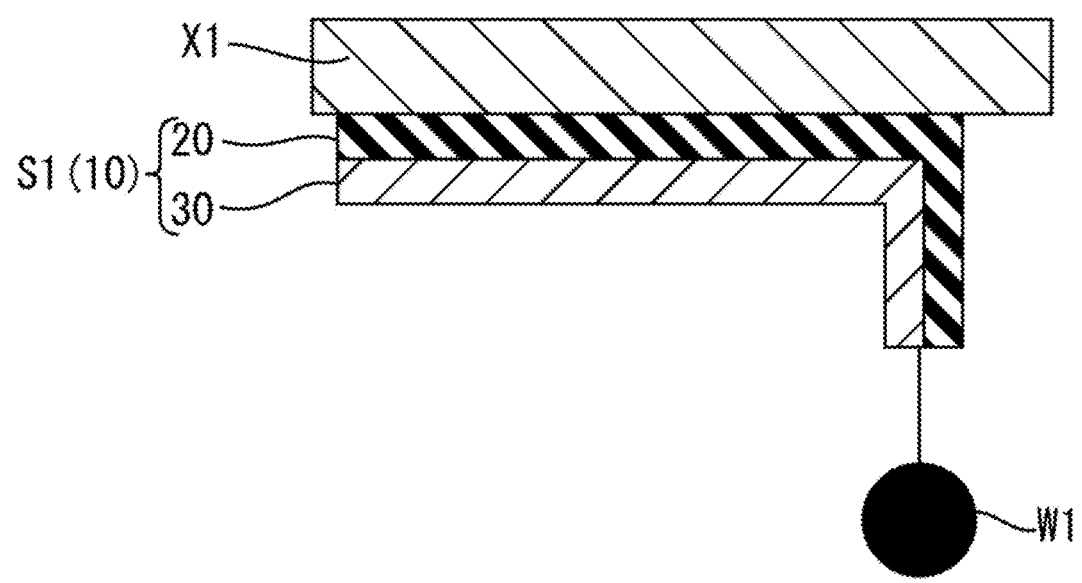
FIG. 4 is a schematic view describing a situation of a constant-load peeling test.

FIG. 4 is a schematic view describing a situation of a constant-load peeling test. Referring to FIG. 4, the following will describe the constant-load peeling test. Initially, from the pressure-sensitive adhesive sheet of each of the working examples and the comparative examples, a measuring sample S1 of 20 mm width×150 mm length was cut out. A pressure-sensitive adhesive surface (pressure-sensitive adhesive layer 20) of this measuring sample S1 was pressed and bonded to a stainless steel plate (SUS: 304BA) X1 by a method of reciprocating a roller of 2 kg weight once on the plate in an atmosphere of 23° C. The resultant was then allowed to stand still in an atmosphere of 25° C. for 30 minutes. Thereafter, a clamp was used to set the measuring-sample-S1-attached stainless steel plate X1 horizontally to face the measuring-sample-S1-attached surface thereof downward. Next, from the stainless steel plate X1, the measuring sample S1 was peeled over a length of 5 mm along the length direction thereof from one of the ends in the same direction of the sample. From the sample end, which was a peeled-part side end of the measuring sample S1, a weight unit having a weight unit W1 of 100 g was hung with a string. A load of 100 g was applied onto the front surface of the stainless steel plate X1 along a direction perpendicular to the surface (90° -peel direction) to start the test. The test was made in an atmosphere of 23° C. The weight unit was attached to a tip of the string passing through an opening made in a central portion in the width direction of the measuring sample Si, this portion being 5 mm apart from the end in the length direction of the sample. In FIG. 4, a positional relationship is shown between the stainless steel plate X1, the measuring sample S1 and the weight unit W1 at the starting time of the constant-load peeling test. After 24 hours from the test start, the test was finished, and then a measurement was made about the distance (peel distance) over which the measuring sample S1 was peeled from the stainless steel plate X1 for 24 hours. The measured value was used as the constant-load peel (24-hour-peel-distance) (mm). The measurement results of the examples are shown in Tables 1-1, 1-2, 2-1 and 2-2.

Holding Ability Test

Figure 5:
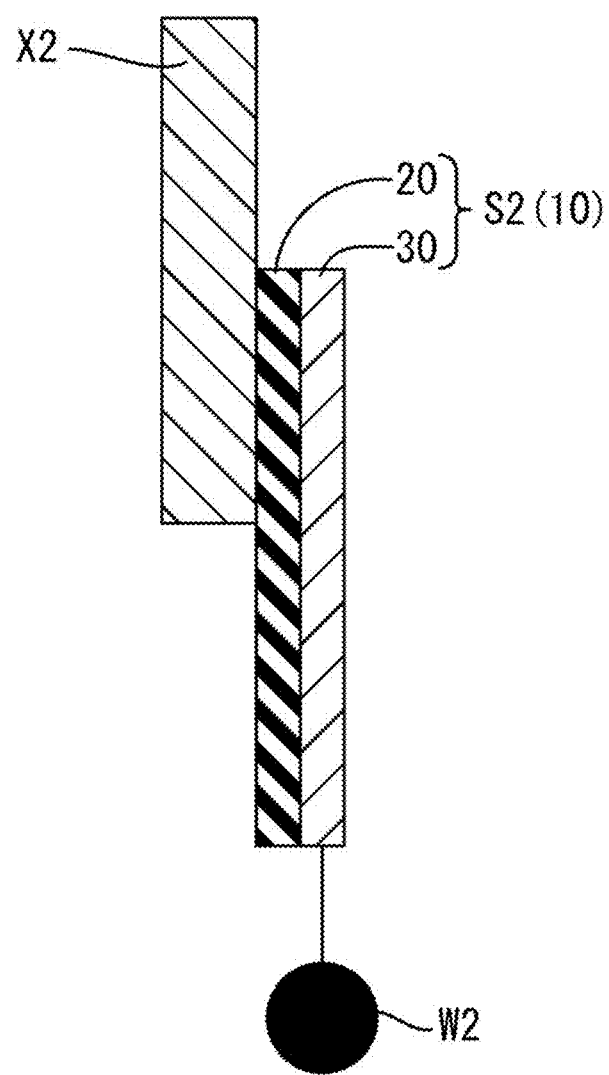
FIG. 5 is a schematic view describing a situation of a holding test.

FIG. 5 is a schematic view describing a situation of a holding test. Referring to FIG. 5, the following will describe the holding ability test. Initially, from the pressure-sensitive adhesive sheet of each of the working examples and the comparative examples, a measuring sample S2 of 10 mm width×100 mm length was cut out. A pressure-sensitive adhesive surface (pressure-sensitive adhesive layer 20) of the measuring sample S2 was pressed and bonded to a stainless steel plate (SUS: 304BA) X2 to give a bonded area (2 cm$^2$) of 10 mm width and 20 mm length by a method of reciprocating a roller of 2 kg weight once on the plate. In an environment of 80° C., the resultant was vertically suspended, and then allowed to stand still for 30 minutes. Thereafter, a weight unit W2 having a weight of 500 g was added to a free end of the measuring sample S2 to start the test. In FIG. 5, a positional relationship is shown between the stainless steel plate X2, the measuring sample S2 and the weight unit W2 at the starting time of the holding abirity measuring test. In accordance with JIS Z 0237, in the 500-g-load added state, the sample was allowed to stand still for one hour in an environment of 80° C. The distance (deviation amount) (mm) of the sample S2, over which the measuring sample S2 deviated during the one hour, was measured. The measurement results of the examples are shown in Tables 1-1, 1-2, 2-1 and 2-2.

Probe Tack Test

The probe tack (kN/m$^2$) of the pressure-sensitive adhesive layer of each of the working examples and the comparative examples was measured by a method in accordance with ASTM D2979 (Test Method for Pressure-Sensitive Tack of Adhesives Using an Inverted Probe Machine) described in the following.

A circular probe (diameter: 5 mm) made of stainless steel in an inverted probe machine was brought into contact, for one second, with the pressure-sensitive adhesive surface of the pressure-sensitive adhesive layer in the state that the peeling liner was peeled while a constant load (100 gf/5-mm-in-diameter) was applied to these contacting members. Thereafter, a force required for pulling away the probe in a vertical direction from the pressure-sensitive adhesive surface was gained. The force value was used as a value of the probe tack (pressure-sensitive adhesive force) of the pressure-sensitive adhesive layer. The contacting speed of the probe was 100 mm/minute, and the pulling speed was 100 mm/minute. The measurement results of the examples are shown in Tables 1-1, 1-2, 2-1 and 2-2.

TABLE 1-1

|  |  | Example 1 | Example 2 | Example 3 | Example 4 | Comparative Example 1 |
|---|---|---|---|---|---|---|
| Pressure-sensitive adhesive layer | Monomers and another component, or polymer, (part(s) by mass) | AA (5) 2EHA (95) 4HBA (0.05) CL(2) | AA (7) BA (93) 4HBA (0.05) CL(2) | AA (7) BA (93) 4HBA (0.05) CL(2) | AA (7) BA (93) 4HBA (0.05) CL(2) | AA (5) 2EHA (95) 4HBA (0.05) CL(2) |
|  | Pressure-sensitive adhesive composition | A (solution) | B (solution) | B (solution) | B (solution) | C (solution) |
|  | Polymer | Acrylic | Acrylic | Acrylic | Acrylic | Acrylic |
|  | Mw (×10$^4$) | 120 | 120 | 120 | 120 | 120 |
|  | Storage modulus (kPa) | 36 | 98 | 98 | 98 | 300 |
|  | Surface tension (dyn/cm) | 48 | 25 | 25 | 25 | 30 |
|  | Thickness (μm) | 30 | 30 | 30 | 30 | 30 |
| Substrate layer | Species | a (laminated layer) | a (laminated layer) | b (aluminum foil piece) | c (aluminum evaporated layer) | a (laminated layer) |
|  | Thickness (μm) | 46 | 46 | 20 | 50 | 46 |
|  | Elastic modulus (N/cm) | 2500 | 2500 | 2400 | 1700 | 2500 |
| Pressure-sensitive adhesive sheet evaluation | Helium leak rate (nPa·m$^3$/s) | 0.042 | 0.25 | 0.055 | 0.063 | 20 |
|  | Pressure-sensitive adhesive force (N/20 mm) | 11 | 11 | 12 | 11 | 2 |
|  | Heating-generated gas (ng/cm$^2$) | 300 | 300 | 300 | 300 | 150 |
|  | Constant-load peel (mm) | 5 | 2 | 5 | 5 | 50 (dropped down) |
|  | Holding ability (deviation amount) (80° C. × 500 g, 1 hr) | 0.1 | 0.1 | 0.1 | 0.1 | 0.1 |
|  | Probe tack (kN/m$^2$) | 35 | 32 | 30 | 32 | 6 |

TABLE 1-2

|  |  | Comparative Example 2 | Comparative Example 3 | Comparative Example 4 | Comparative Example 5 | Example 5 |
|---|---|---|---|---|---|---|
| Pressure-sensitive adhesive layer | Monomers and another component, or polymer, (part(s) by mass) | AA (5) 2EHA (95) 4HBA (0.05) CL(1) | AA (7) BA (93) 4HBA (0.05) CL(2) | AA (7) BA (93) 4HBA (0.05) CL(2) | AA (7) BA (93) 4HBA (0.05) CL(2) | SIS (100) CL(2) |
|  | Pressure-sensitive adhesive composition | D (solution) | B (solution) | B (solution) | B (solution) | E (solution) |
|  | Polymer | Acrylic | Acrylic | Acrylic | Acrylic | Rubber |
|  | Mw (×$10^4$) | 120 | 120 | 120 | 120 | 17 |
|  | Storage modulus (kPa) | 10 | 98 | 98 | 98 | 17 |
|  | Surface tension (dyn/cm) | 25 | 25 | 25 | 25 | 25 |
|  | Thickness (μm) | 30 | 10 | 30 | 30 | 30 |
| Substrate layer | Species | a (laminated layer) | a (laminated layer) | d (PET) | e (aluminum foil piece) | a (laminated layer) |
|  | Thickness (μm) | 46 | 46 | 50 | 50 | 46 |
|  | Elastic modulus (N/cm) | 2500 | 2500 | 1670 | 9600 | 2500 |
| Pressure-sensitive adhesive sheet evaluation | Helium leak rate (nPa · $m^3$/s) | 1.5 | 2.5 | 15 | 25 | 0.17 |
|  | Pressure-sensitive adhesive force (N/20 mm) | 13 | 3 | 5 | 15 | 25 |
|  | Heating-generated gas (ng/$cm^2$) | 600 | 300 | 300 | 300 | 1500 |
|  | Constant-load peel (mm) | 50 (dropped down) | 50 (dropped down) | 5 | 5 | 5 |
|  | Holding ability (deviation amount) (80° C. × 500 g, 1 hr) | 20 (dropped down) | 20 (dropped down) | 0.1 | 0.1 | 0.5 |
|  | Probe tack (kN/$m^2$) | 70 | 5 | 32 | 28 | 30 |

TABLE 2-1

|  |  | Example 6 | Example 7 | Comparative Example 6 | Comparative Example 7 |
|---|---|---|---|---|---|
| Pressure-sensitive adhesive layer | Monomers and another component, or polymer, (part(s) by mass) | AA (6) 2EHA (94) DPHA (0.05) | AA (6) 2EHA (94) DPHA (0.05) | AA (20) 2EHA (94) DPHA (0.05) | 2EHA (100) DPHA (0.05) |
|  | Pressure-sensitive adhesive composition | F (syrup) | F (syrup) | G (syrup) | H (syrup) |
|  | Polymer | Acrylic | Acrylic | Acrylic | Acrylic |
|  | Mw (×$10^4$) | 60 | 60 | 60 | 60 |
|  | Storage modulus (kPa) | 40 | 40 | 300 | 10 |
|  | Surface tension (dyn/cm) | 48 | 48 | 62 | 19 |
|  | Thickness (μm) | 150 | 200 | 30 | 30 |
| Substrate layer | Species | a (laminated layer) | a (laminated layer) | a (laminated layer) | a (laminated layer) |
|  | Thickness (μm) | 46 | 46 | 46 | 46 |
|  | Elastic modulus (N/cm) | 2500 | 2500 | 2500 | 2500 |
| Pressure-sensitive adhesive sheet evaluation | Helium leak rate (nPa · $m^3$/s) | 0.075 | 0.083 | 2.5 | 0.57 |
|  | Pressure-sensitive adhesive force (N/20 mm) | 15 | 18 | 9 | 2 |
|  | Heating-generated gas (ng/$cm^2$) | 5400 | 7500 | 300 | 300 |
|  | Constant-load peel (mm) | 2 | 1 | 50 (dropped down) | 50 (dropped down) |
|  | Holding ability (deviation amount) (80° C. × 500 g, 1 hr) | 0.1 | 0.15 | 0.1 | 20 (dropped down) |
|  | Probe tack (kN/$m^2$) | 90 | 105 | 28 | 12 |

TABLE 2-2

|  |  | Comparative Example 8 | Example 8 | Example 9 |
|---|---|---|---|---|
| Pressure-sensitive adhesive layer | Monomers and another component, or polymer, (part(s) by mass) | NVP (6) 2EHA (82) 2MEA (12) DPHA (0.05) filler (250) | AA (6) iOA (94) DPHA (0.05) | AA (6) iNA (94) DPHA (0.05) |
|  | Pressure-sensitive adhesive composition | I (syrup) | J (syrup) | K (syrup) |
|  | Polymer | Acrylic | Acrylic | Acrylic |
|  | Mw (×10$^4$) | 65 | 60 | 65 |
|  | Storage modulus (kPa) | 1500 | 70 | 90 |
|  | Surface tension (dyn/cm) | 35 | 50 | 52 |
|  | Thickness (μm) | 50 | 150 | 150 |
| Substrate layer | Species | a (laminated layer) | a (laminated layer) | a (laminated layer) |
|  | Thickness (μm) | 46 | 46 | 46 |
|  | Elastic modulus (N/cm) | 2500 | 2500 | 2500 |
| Pressure-sensitive adhesive sheet evaluation | Helium leak rate (nPa·m$^3$/s) | 2 | 0.100 | 0.160 |
|  | Pressure-sensitive adhesive force (N/20 mm) | 8 | 10 | 9 |
|  | Heating-generated gas (ng/cm$^2$) | 1800 | 5400 | 5000 |
|  | Constant-load peel (mm) | 50 (dropped down) | 2 | 3 |
|  | Holding ability (deviation amount) (80° C. × 500 g, 1 hr) | 20 (dropped down) | 0.1 | 0.1 |
|  | Probe tack (kN/m$^2$) | 60 | 80 | 65 |

As shown in Tables 1-1, 1-2, 2-1 and 2-2, about each of the pressure-sensitive adhesive sheets of Examples 1 to 9, the deviation amount thereof was less than 1.0 mm, the amount being the deviation amount of the pressure-sensitive adhesive sheet per 250 gf/cm$^2$ of the sheet in the holding ability test at 80° C. after one hour from the time when the test was started, the helium leak rate was less than 1 nPa·m$^3$/s, and the peel distance was less than 50 mm, the distance being the peel distance of the sheet in the 100-g-constant-load peeling test at 23° C. after 24 hours from the time when the test was started. Thus, it was verified that these sealing sheets were excellent in airtight performance.

In contrast, about the pressure-sensitive adhesive sheet of Comparative Example 1, the storage modulus of the pressure-sensitive adhesive layer was too high, so that the helium leak rate was large, and further in the constant-load peeling test, the measuring sample was peeled and dropped down.

About the pressure-sensitive adhesive sheet of Comparative Example 2, in the holding ability test, the measuring sample was peeled and dropped down, and in the constant-load peeling test, the measuring sample was peeled and dropped down. It can be mentioned about the pressure-sensitive adhesive sheet of Comparative Example 2 that the pressure-sensitive adhesive layer was too low in storage modulus.

About the pressure-sensitive adhesive sheet of Comparative Example 3, in the holding ability test, the measuring sample was peeled and dropped down, and in the constant-load peeling test, the measuring sample was peeled and dropped down. It can be mentioned about the pressure-sensitive adhesive sheet of Comparative Example 3 that the pressure-sensitive adhesive layer was too small in thickness.

About the pressure-sensitive adhesive sheet of Comparative Example 4, the substrate layer was too low in elastic modulus, so that the helium leak rate was large.

About the pressure-sensitive adhesive sheet of Comparative Example 5, the substrate layer was too low in elastic modulus, so that the helium leak rate was large.

About the pressure-sensitive adhesive sheet of Comparative Example 6, the pressure-sensitive adhesive layer was too high in storage modulus, so that the helium leak rate was large, and further in the constant-load peeling test, the measuring sample was peeled and dropped down.

About the pressure-sensitive adhesive sheet of Comparative Example 7, in the holding ability test, the measuring sample was peeled and dropped down, and in the constant-load peeling test, the measuring sample was peeled and dropped down. It can be mentioned about the pressure-sensitive adhesive sheet of Comparative Example 7 that the pressure-sensitive adhesive layer was low in surface tension and also low in probe tack. It can be mentioned that the pressure-sensitive adhesive sheet of Comparative Example 7 was also low in pressure-sensitive adhesive force.

About the pressure-sensitive adhesive sheet of Comparative Example 8, the pressure-sensitive adhesive layer was too high in storage modulus so that the helium leak rate was large, in the holding ability test, the measuring sample was peeled and dropped down, and in the constant-load peeling test, the measuring sample was peeled and dropped down.

Reference Number List

The invention claimed is:
1. A pressure-sensitive adhesive sheet comprising:
a pressure-sensitive adhesive layer; and
a substrate layer configured to support the pressure-sensitive adhesive layer, wherein
the pressure-sensitive adhesive layer having a storage modulus of 250 kPa or less at 23° C.,
the substrate layer having an elastic modulus of 1680 N/cm to 3000 N/cm both inclusive, and
the pressure-sensitive adhesive sheet showing a deviation amount less than 1.0 mm, the amount being the deviation amount of the pressure-sensitive adhesive sheet per

250 gf/cm² of the sheet in a holding ability test at 80° C. after one hour from a time when the test is started.

2. The pressure-sensitive adhesive sheet according to claim 1, wherein the pressure-sensitive adhesive layer has a probe tack of 20 kN/m² or more at 23° C.

3. The pressure-sensitive adhesive sheet according to claim 1, wherein the pressure-sensitive adhesive layer has a storage modulus of 12 kPa or more at 23° C.

4. The pressure-sensitive adhesive sheet according to claim 1, wherein the pressure-sensitive adhesive layer has a thickness of 15 μm or more.

5. The pressure-sensitive adhesive sheet according to claim 1, wherein the pressure-sensitive adhesive layer has a surface tension of 20 dyn/cm or more.

6. The pressure-sensitive adhesive sheet according to claim 1, wherein the substrate layer has a thickness of 10 μm to 100 μm both inclusive.

7. The pressure-sensitive adhesive sheet according to claim 1, wherein the pressure-sensitive adhesive layer has a thickness of 200 μm or less.

8. The pressure-sensitive adhesive sheet according to claim 1, wherein the pressure-sensitive adhesive layer has a surface tension of 60 dyn/cm or less.

9. The pressure-sensitive adhesive sheet according to claim 1, wherein the pressure-sensitive adhesive layer comprises at least one selected from the group consisting of acrylic polymers, ester polymers, and rubber polymers.

10. The pressure-sensitive adhesive sheet according to claim 1, wherein the substrate layer comprises one selected from the group consisting of a plastic layer, a metallic layer and a composite layer comprising the two layers.

11. The pressure-sensitive adhesive sheet according to claim 1, wherein when the pressure-sensitive adhesive sheet is used to isolate a helium gas filled container having a pressure of 3000 Pa and a pressure container having a pressure of 1 Pa from each other, the proportion of the helium gas which leaks from the helium gas filled container to the pressure container is less than $1 \times 10^{-9}$ Pa·m³/s.

12. The pressure-sensitive adhesive sheet according to claim 1, wherein a peel distance is less than 50 mm, the peel distance being the peel distance of the sheet in a 100-g-constant-load peeling test at 23° C. after 24 hours from a time when the test is started.

13. The pressure-sensitive adhesive sheet according to claim 1, wherein the pressure-sensitive adhesive layer has a 180°-peel pressure-sensitive adhesive force of 5 N/20 mm or more from a stainless steel plate.

14. The pressure-sensitive adhesive sheet according to claim 1, wherein a generated gas amount is less than 6000 ng/cm² when the pressure-sensitive adhesive layer is heated at 130° C. for 30 minutes.

15. The pressure-sensitive adhesive sheet according to claim 2, wherein the pressure-sensitive adhesive layer has a storage modulus of 12 kPa or more at 23° C.

16. The pressure-sensitive adhesive sheet according to claim 2, wherein the pressure-sensitive adhesive layer has a thickness of 15 μm or more.

17. The pressure-sensitive adhesive sheet according to claim 3, wherein the pressure-sensitive adhesive layer has a thickness of 15 μm or more.

18. The pressure-sensitive adhesive sheet according to claim 2, wherein the pressure-sensitive adhesive layer has a surface tension of 20 dyn/cm or more.

19. The pressure-sensitive adhesive sheet according to claim 3, wherein the pressure-sensitive adhesive layer has a surface tension of 20 dyn/cm or more.

20. The pressure-sensitive adhesive sheet according to claim 4, wherein the pressure-sensitive adhesive layer has a surface tension of 20 dyn/cm or more.

21. The pressure-sensitive adhesive sheet according to claim 1, wherein the pressure-sensitive adhesive layer comprises a crosslinking agent in an amount larger than 1.0 part by mass and 4.0 parts by mass or less based on 100 part by mass of a base polymer included in the pressure-sensitive adhesive layer.

22. The pressure-sensitive adhesive sheet according to claim 1, wherein an isocyanate crosslinking agent is blended into the pressure-sensitive adhesive layer in an amount of 1.5 parts by mass to 4.0 parts by mass based on 100 part by mass of a base polymer included in the pressure-sensitive adhesive layer.

23. The pressure-sensitive adhesive sheet according to claim 1, wherein a pressure-sensitive adhesive forming the pressure-sensitive adhesive layer is an ultraviolet ray cured pressure-sensitive adhesive.

24. The pressure-sensitive adhesive sheet according to claim 1, wherein the pressure-sensitive adhesive layer comprises an acrylic polymer as base polymer, and the acrylic polymer includes a polyfunctional monomer as monomer units in a proportion more than 0% by mass and 0.1% by mass or less.

25. The pressure-sensitive adhesive sheet according to claim 1, wherein the pressure-sensitive adhesive layer comprises a rubber polymer as base polymer, and the rubber polymer is selected from the group consisting of styrene-isoprene-styrene block copolymer, styrene-butadiene-styrene block copolymer, a hydrogenated product of at least one of the block copolymers, styrene-butadiene rubber, polyisoprene rubber, polyisobutylene, and butyl rubber.

26. The pressure-sensitive adhesive sheet according to claim 1, wherein the pressure-sensitive adhesive layer comprises a styrene-isoprene block copolymer as base polymer.

* * * * *